(12) United States Patent
Ochiai

(10) Patent No.: US 9,091,350 B2
(45) Date of Patent: Jul. 28, 2015

(54) SPINNING REEL WATERPROOFING MEMBER AND SPINNING REEL USING THE SAME

(71) Applicant: Shimano Inc., Sakai, Osaka (JP)

(72) Inventor: Koji Ochiai, Osaka (JP)

(73) Assignee: Shimano Inc., Osaka (JP)

( * ) Notice: Subject to any disclaimer, the term of this patent is extended or adjusted under 35 U.S.C. 154(b) by 240 days.

(21) Appl. No.: 13/745,583

(22) Filed: Jan. 18, 2013

(65) Prior Publication Data

US 2013/0206889 A1 Aug. 15, 2013

(30) Foreign Application Priority Data

Feb. 10, 2012 (JP) ................................. 2012-027430
Mar. 1, 2012 (JP) ................................. 2012-045630

(51) Int. Cl.
*F16J 15/32* (2006.01)
*A01K 89/00* (2006.01)
*A01K 89/01* (2006.01)

(52) U.S. Cl.
CPC .............. *F16J 15/3204* (2013.01); *A01K 89/00* (2013.01); *A01K 89/01* (2013.01); *A01K 89/0117* (2013.01); *F16J 15/324* (2013.01)

(58) Field of Classification Search
CPC ...................................................... A01K 89/01
USPC .................................................. 242/319, 320
See application file for complete search history.

(56) References Cited

U.S. PATENT DOCUMENTS

| | | | | |
|---|---|---|---|---|
| 4,428,630 A * | 1/1984 | Folger et al. | ................... | 384/482 |
| 4,834,397 A * | 5/1989 | Shimasaki et al. | ............ | 277/564 |
| 6,102,317 A * | 8/2000 | Bernard et al. | ............... | 242/319 |
| 6,149,089 A * | 11/2000 | Matsuda | ....................... | 242/319 |
| 6,457,662 B1 * | 10/2002 | Sato | .............................. | 242/247 |
| 6,637,690 B2 * | 10/2003 | Matsuda | ....................... | 242/231 |
| 6,874,719 B2 * | 4/2005 | Ikuta | ............................. | 242/319 |

(Continued)

FOREIGN PATENT DOCUMENTS

| | | |
|---|---|---|
| EP | 0986953 A1 | 3/2000 |
| JP | 2001112383 A | 4/2001 |

(Continued)

OTHER PUBLICATIONS

Extended European Search Report of the corresponding European Application No. 13154499.1, dated Jun. 6, 2013.

(Continued)

*Primary Examiner* — Emmanuel M Marcelo
(74) *Attorney, Agent, or Firm* — Global IP Counselors

(57) ABSTRACT

A spinning reel waterproofing member is provided for waterproofing a space between a tubular portion and a rotating member of a spinning reel. The tubular portion is disposed on a front end of a reel main body. The rotating member is disposed on an inner peripheral portion of the tubular portion and a front portion of the tubular portion. The spinning reel waterproofing member includes a main body portion being fixed to the inner peripheral portion of the tubular portion and including a distal end portion, a first lip portion extending in a radial direction so that the distal end portion of the main body portion is in contact with an outer peripheral portion of the rotating member, and a second lip portion extending in an axial direction from a front surface of the first lip portion toward a rear surface of the rotating member.

17 Claims, 17 Drawing Sheets

(56) References Cited

U.S. PATENT DOCUMENTS

2002/0023980 A1* 2/2002 Matsuda et al. .............. 242/319
2002/0079395 A1* 6/2002 Matsuda ....................... 242/231

FOREIGN PATENT DOCUMENTS

JP      2002-354974 A    12/2002
JP      2012-019752 A     2/2012

OTHER PUBLICATIONS

Database WPI, Week 201210, AN 2012-B35241, XP002697681, Thomson Scientific, London, Great Britain.

* cited by examiner

SPINNING REEL WATERPROOFING MEMBER AND SPINNING REEL USING THE SAME

CROSS-REFERENCE TO THE RELATED APPLICATIONS

This application claims priority to Japanese Patent Application Nos. 2012-027430 and 2012-045630 filed on Feb. 10, 2012 and Mar. 1, 2012 respectively. The entire disclosure of Japanese Patent Application Nos. 2012-027430 and 2012-045630 is hereby incorporated herein by reference.

BACKGROUND

1. Technical Field

The present invention relates to a spinning reel waterproofing member, particularly a spinning reel waterproofing member that waterproofs spaces between a tubular portion disposed on a front end of a reel main body of a spinning reel and a rotating member disposed on an inner peripheral portion of the tubular portion and a front portion of the tubular portion, and to a spinning reel using the waterproofing member.

2. Related Art

A spinning reel generally has a reel main body that is arranged to be attached to a fishing rod, a handle that is mounted on the reel main body in such a way that the handle can freely rotate, a rotor that is attached to the reel main body in such a way that the rotor can freely rotate, and a spool that is attached on the front side of the rotor to the reel main body in such a way that the spool can freely move frontward and rearward and has an outer periphery onto which is wound a fishing line guided by the rotor. The reel main body has a main body member whose side portions are open and which has a housing space inside, a covering member that is detachably attached to the main body member in such a way as to cover the openings in the main body member, and a bottomed tube-like tubular portion in which a roller clutch disposed in a front portion of the main body member is housed. The roller clutch is disposed in order to prohibit the reverse rotation of the rotor and a seal member for preventing water ingress into the roller clutch is attached to the front portion of the tubular portion (e.g., see JP-A No. 2001-112383).

This type of seal member is an annular lip member made of a synthetic resin elastic body. The seal member is placed on the front portion of the roller clutch in such a way that the outer peripheral portion of the seal member is in contact with the front portion inner peripheral surface of the tubular portion of the reel main body, and the seal member is placed with the inner peripheral portion of the seal member projecting in a radial direction in such a way that the inner peripheral portion is in contact with the outer peripheral surface of a boss portion of the rotor. Further, the outer peripheral portion of the seal member is retained and fixed in such a way that the outer peripheral portion is in contact with the front portion of an outer race of the roller clutch, by a retainer spring attached from the front.

SUMMARY

The seal member of the well-known spinning reel described above can prevent water ingress into the roller clutch because the seal member is placed with the inner peripheral portion of the seal member projecting in the radial direction in such a way that the inner peripheral portion is in contact with the outer peripheral surface of the boss portion of the rotor. However, if a large amount of water flows into the interstice between the rear surface of the rotor disposed on the front portion of the tubular portion and the front surface of the seal member, there arises the concern that the water pressure acting on the inner peripheral portion of the seal member will increase and that the waterproofing performance of the seal member will deteriorate.

A spinning reel waterproofing member for waterproofing a space between a tubular portion and a rotating member of a spinning reel is provided. The tubular portion is disposed on a front end of a reel main body of the spinning reel. The rotating member is disposed on an inner peripheral portion of the tubular portion and a front portion of the tubular portion. The spinning reel waterproofing member includes a main body portion, a first lip portion, and a second lip portion. The main body portion is fixed to the inner peripheral portion of the tubular portion and including a distal end portion, wherein the distal end portion extends to an inner peripheral side. The first lip portion extends in a radial direction so that the distal end portion of the main body portion is in contact with an outer peripheral portion of the rotating member. The second lip portion extending in an axial direction from a front surface of the first lip portion toward a rear surface of the rotating member.

DETAILED DESCRIPTION OF THE PREFERRED EMBODIMENT

First Embodiment

Figure 1:
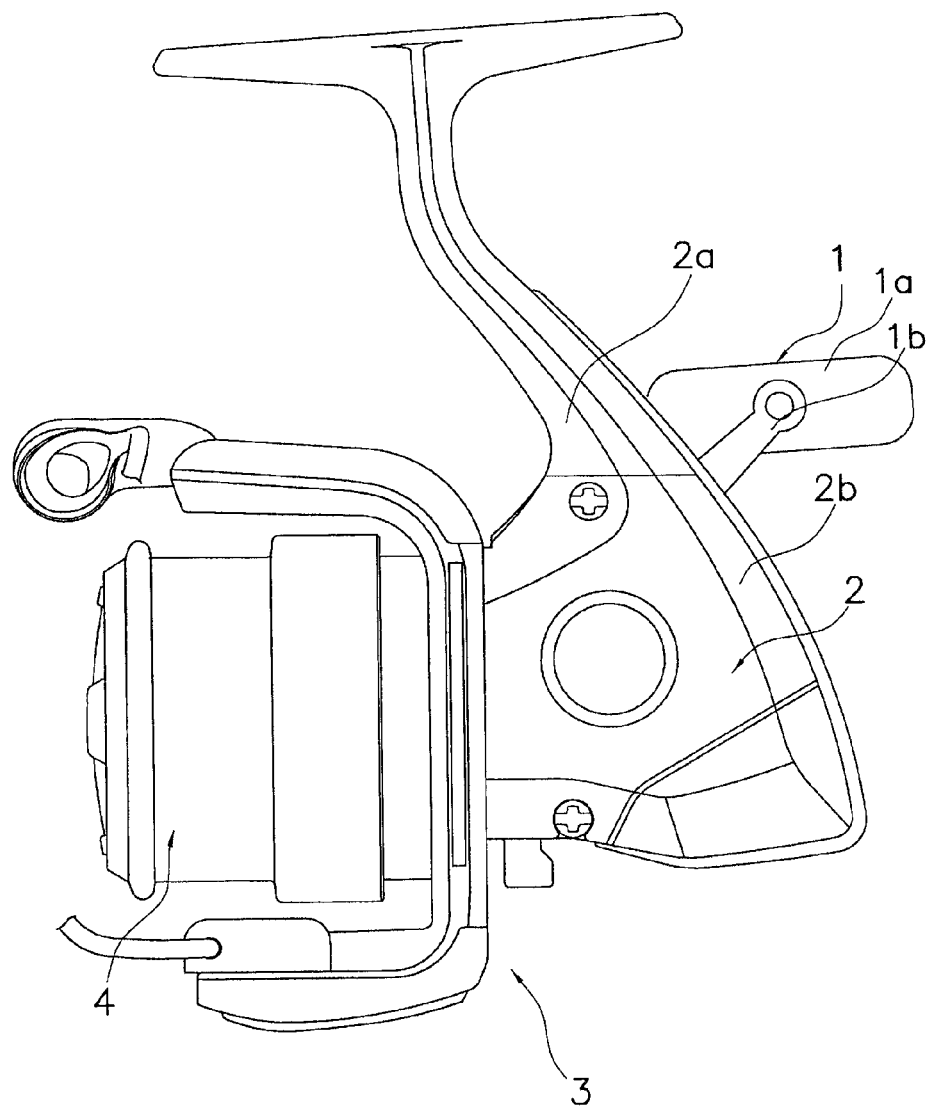
FIG. 1 is a left side view of a spinning reel employing a first embodiment of the present invention.
Figure 2:
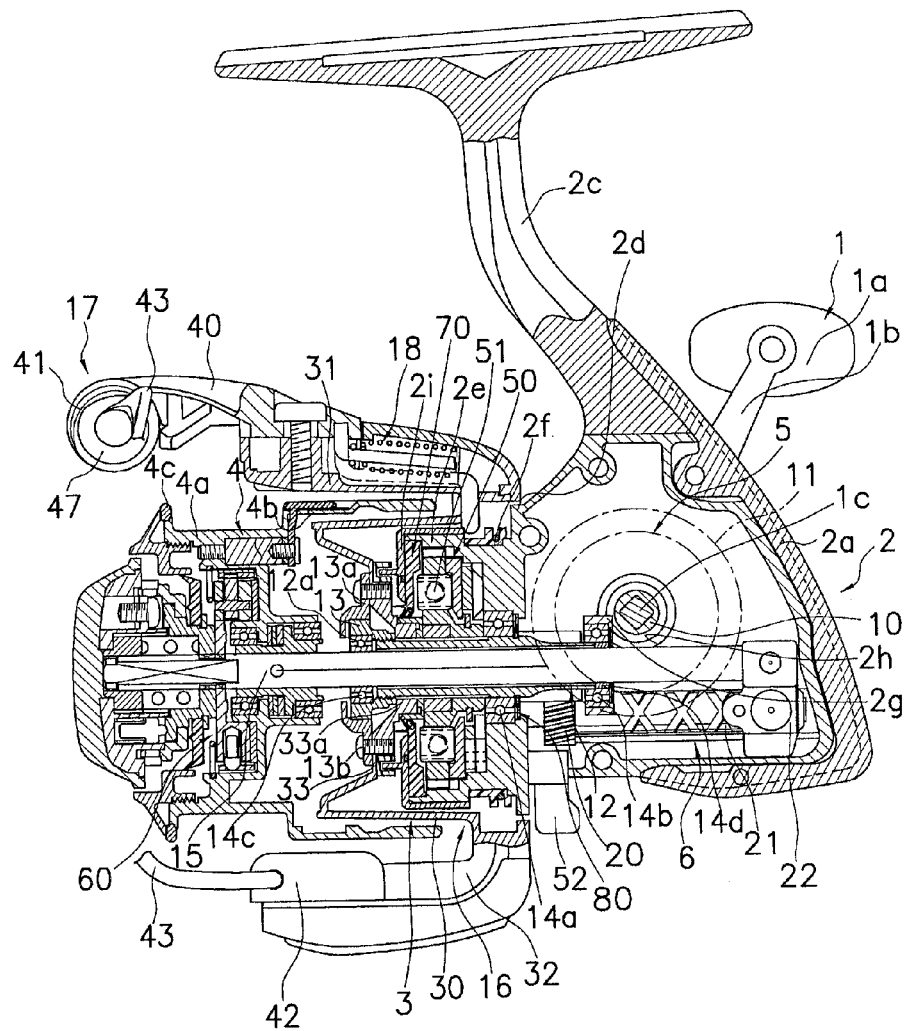
FIG. 2 is a left side sectional view of the spinning reel.

As shown in FIG. 1 and FIG. 2, a spinning reel of this embodiment of the present invention is equipped with a handle 1, a reel main body 2 that supports the handle 1 in such a way that the handle 1 can freely rotate, a rotor 3, and a spool 4. The rotor 3 is supported on the front portion of the reel main body 2 in such a way that the rotor 3 can freely rotate. The spool 4 retracts a fishing line onto its outer peripheral surface and is placed on the front portion of the rotor 3 in such a way that the spool 4 can freely move frontward and rearward. In FIG. 1 the handle 1 is attached to the left side of the reel main body 2, and in FIG. 2 the handle 1 is attached to the right side of the reel main body 2. In this way, the handle 1 can be attached to either the left side or the right side of the reel main body 2.

The handle 1 has a T-shaped handle knob 1a and a handle arm 1b. The handle knob 1a is attached to the distal end of the handle arm 1b in such a way that the handle knob 1a can freely rotate. The handle 1 further has a handle shaft portion 1c on the proximal end portion of the handle arm 1b. The handle shaft portion 1c is extending in a direction intersecting the handle arm 1b and is non-rotatably attached to a later-described handle shaft 10.

The reel main body 2 has a reel body 2a and a covering member 2b. The reel body 2a has a space inside, and the covering member 2b is detachably attached to the reel body 2a in order to close off the space in the reel body 2a.

The reel body 2a is made of aluminum alloy, for example. A T-shaped rod mounting foot 2c that extends frontward and rearward is integrally formed on the upper portion of the reel body 2a. As shown in FIG. 2, a rotor drive mechanism 5 that causes the rotor 3 to rotate in conjunction with the rotation of the handle 1 and an oscillating mechanism 6 for causing the spool 4 to move frontward and rearward to uniformly retract the fishing line are disposed in the space in the reel body 2a. A circular flange portion 2d and a cylinder portion 2e are formed on the front end of the reel body 2a and the covering member 2b. The cylinder portion 2e is smaller in diameter than the flange portion 2d and has a distal end that is open. An attachment groove 2f whose cross section is cut out in a circular shape is formed in the cylinder portion 2e.

Figure 3:
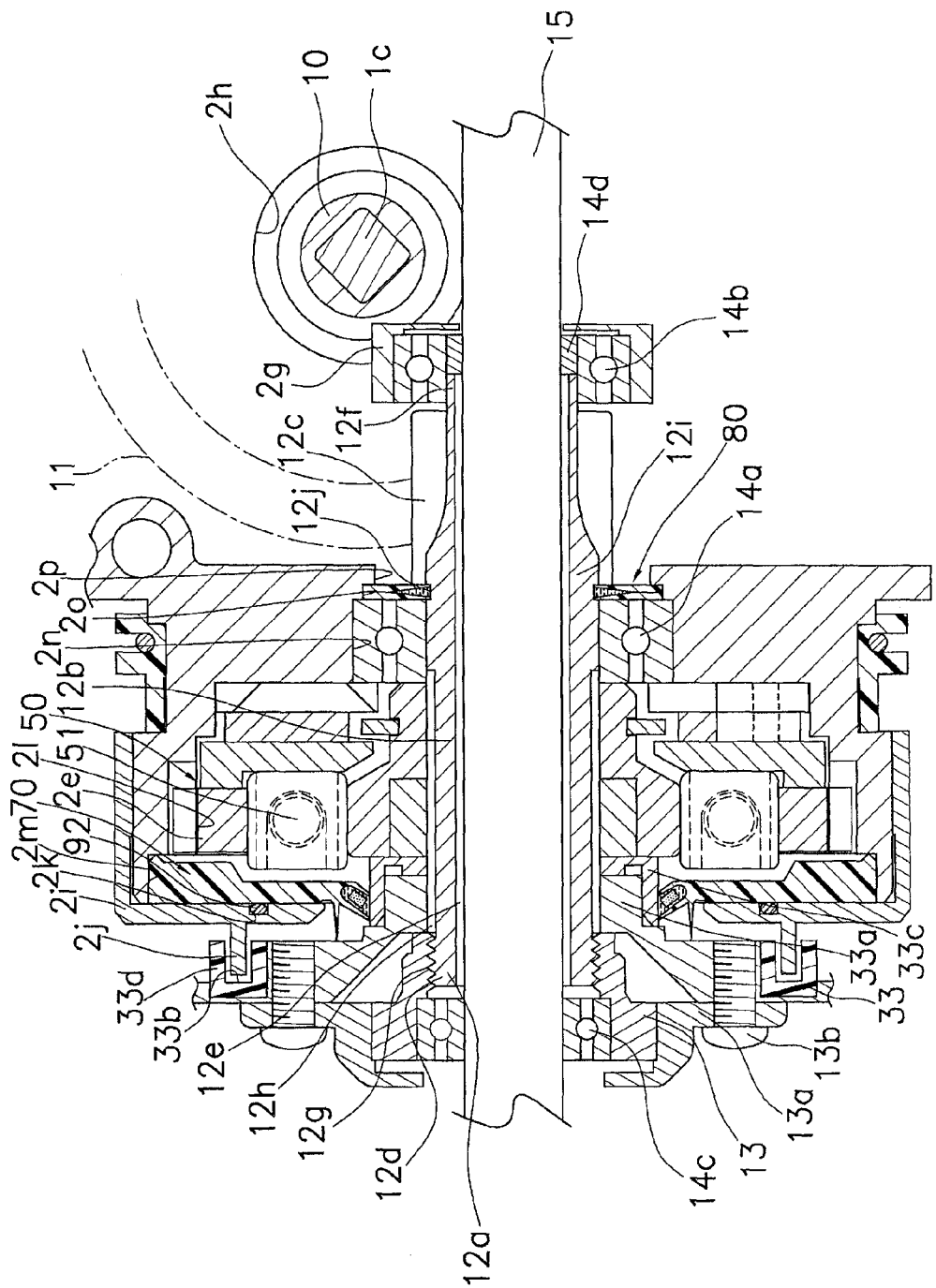
FIG. 3 is an enlarged side sectional view of the environs of a pinion gear.

As shown in FIG. 2 and FIG. 3, a bottomed tube-like mounting recess portion 2g is formed on the side portion of the reel body 2a. A later-described spool shaft 15 penetrates the mounting recess portion 2g, and the mounting recess portion 2g can house a later-described second bearing 14b from the front. The mounting recess portion 2g is a boss being open at a front portion thereof. The mounting recess portion 2g has, in the center of its rear portion, a bottom portion at which a through hole is formed. The spool shaft 15 penetrates the through hole. The mounting recess portion 2g is formed by T-slot cutting a sidewardly projecting section of the reel body 2a. Further, unillustrated circular through holes through which the handle shaft 10 can be inserted are formed in the side portions of the reel body 2a and the covering member 2b. Attachment recess portions 2h are recessed around the through holes in the inside surfaces of the reel body 2a and the covering member 2b. The attachment recess portions 2h can house unillustrated rolling bearings that support the handle shaft 10 in such a way that the handle shaft 10 can freely rotate. Here, the mounting recess portions 2g are formed by T-slot cutting, so the attachment recess portions 2h can be placed in positions in which parts of the rear end portions of the mounting recess portions 2g overlap the attachment recess portions 2h as seen from the side. For this reason, it becomes unnecessary to administer processing that cuts out parts of the rear end portions of the mounting recess portions 2g, and the withstand load acting on the rolling bearings can be increased because the rolling bearings that support the handle shaft 10 can be enlarged because the attachment recess portions 2h can be increased in diameter.

The covering member 2b is a member made of aluminum alloy, for example, and is fastened with screws to the reel body 2a in three places, for example.

As shown in FIG. 2, the rotor 3 has a rotor main body 16, a bail arm 17, and a bail reversing mechanism 18. The bail arm 17 is attached to the distal end of the rotor main body 16 in such a way that the bail arm 17 can freely swing between a line release position and a line retraction position. The bail reversing mechanism 18 is attached to the rotor main body 16 in order to return the bail arm 17 from the line release position to the line retraction position.

The rotor main body 16 has a cylinder portion 30, a first rotor arm 31, and a second rotor arm 32. The cylinder portion 30 is attached to the reel body 2a in such a way that the cylinder portion 30 can freely rotate about the spool shaft 15. The first rotor arm 31 and the second rotor arm 32 are disposed opposing each other on the sides of the cylinder portion 30. The cylinder portion 30, the first rotor arm 31, and the second rotor arm 32 are made of aluminum alloy, for example, and are integrally molded.

A front wall 33 is formed on the front portion of the cylinder portion 30, and a boss portion 33a is formed in the central portion of the front wall 33. A through hole is formed in the center portion of the boss portion 33a, and a front portion 12a of a pinion gear 12 and the spool shaft 15 penetrate this through hole. A nut member 13 for fixing the rotor 3 is placed on the front portion of the front wall 33.

A first bail support member 40 is attached to the outer peripheral side of the distal end of the first rotor arm 31 in such a way that the first bail member 40 can freely swing. A second bail support member 42 is attached to the inner peripheral side of the distal end of the second rotor arm 32 in such a way that the second bail support member 42 can freely swing. A line roller 41 for guiding the fishing line to the spool 4 and a fixing shaft cover 47 that is fixed to the first bail support member 40 with the line roller 41 in between are attached to the distal end of the first bail support member 40. The line roller 41 is attached to the distal end of the first bail support member 40 in such a way that the line roller 41 can freely rotate. The fixing shaft cover 47 has a transformed cone shape whose distal end is pointed. A bail 43 having a shape obtained by curving wire rod into a substantial U shape is fixed between the distal end portion of the fixing shaft cover 47 and the second bail support member 42. The bail arm 17 that guides the fishing line to the spool 4 is configured by the first bail support member 40, the second bail support member 42, the line roller 41, the bail 43, and the fixing shaft cover 47.

The bail reversing mechanism 18 is placed inside a housing space in the first rotor arm 31. The bail reversing mechanism 18 is disposed for causing the bail arm 17 to return from the line release position to the line retraction position in conjunction with the rotation of the rotor 3 and for holding the state of the bail arm 17 in both positions.

As shown in FIG. 2, an anti-reverse mechanism 50 for prohibiting the reverse rotation of the rotor 3 and cancelling the prohibition is placed inside the cylinder portion 30 of the rotor 3. The anti-reverse mechanism 50 has a roller clutch 51 and a stopper 52. The roller clutch 51 is a roller one-way clutch attached to the inner peripheral portion of the cylinder portion 2e. The stopper 52 is placed on the lower portion of the reel body 2a and switches the roller clutch 51 between an actuated state and a non-actuated state. The roller clutch 51 has an outer race that is attached to the inner peripheral side of the cylinder portion 2e and an inner race that is attached to the outer peripheral portion of the pinion gear 12. Here, by swinging the stopper 52 left and right, the roller clutch 51 is switched between the actuated state and the non-actuated state.

Figure 4:
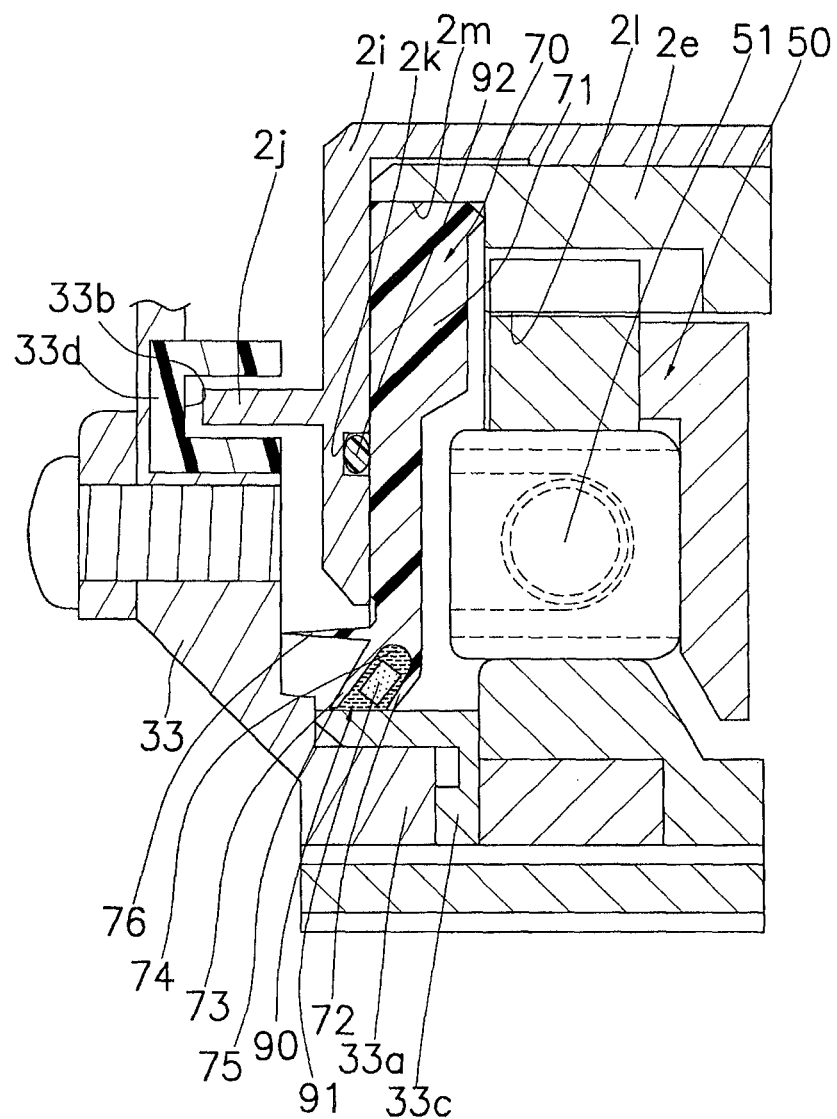
FIG. 4 is an enlarged side sectional view of the environs of a roller clutch.

As shown in FIG. 3 and FIG. 4, the roller clutch 51 is attached to a first front side inner peripheral portion 2*l*, which is an inner peripheral portion of the cylinder portion 2*e*. A first waterproofing member 70 for waterproofing the roller clutch 51 is attached to a second front side inner peripheral portion 2*m*. The second front side inner peripheral portion 2*m* is placed on the front side (the left side in FIG. 4) of the first front side inner peripheral portion 2*l* and is the front end inner peripheral portion of the cylinder portion 2*e* that becomes a stepped recess portion that is larger in diameter than the first front side inner peripheral portion 2*l*. A bottomed tube-like cover member 2*i* for covering the front side of the roller clutch 51 is attached to the outer periphery of the front end portion of the cylinder portion 2*e*. The first waterproofing member 70 is held between the rear surface of the bottom portion of the cover member 2*i* and the front surface of the step portion between the first front side inner peripheral portion 2*l* and the second front side inner peripheral portion 2*m*, whereby the first waterproofing member 70 is fixed to the cylinder portion 2*e*.

As shown in FIG. 4, the cover member 2*i* has a cylindrical projecting portion 2*j* and a recess portion 2*k*. The projecting portion 2*j* projects frontward from the front surface of the bottom portion of the cover member 2*i*. The recess portion 2*k* is formed as a result of the rear surface of the bottom portion of the cover member 2*i*, with which the front surface of the first waterproofing member 70 is in contact, being annularly recessed. The projecting portion 2*j* is inserted into a recess portion 33*b* of a rubber member 33 made of rubber. The rubber member 33 is fastened with screws to, in such a way as to project from, the rear surface of the front wall 33 of the cylinder portion 30 of the rotor 3. The recess portion 33*b* is formed as a result of the rear surface of the rubber member 33*d* being annularly recessed. Here, a labyrinth structure is formed by the recess portion 33*b* and the projecting portion 2*j*, so it is difficult for water to come inside. Moreover, here, by disposing the rubber member 33*d* that is a body separate from the front wall 33, rotational resistance does not increase that much and a sense of incongruity does not arise even if the rubber member 33*d* and the cover member 2*i* come into contact with each other due to assembly error or deformation or displacement resulting from a load at the time of wind-up. Because of this, the clearance between the rubber member 33*d* and the cover member 2*i* can be filled, and the waterproofing performance can be further improved. Further, an O-ring 92 made of synthetic resin is attached to the recess portion 2*k*, and the O-ring 92 can prevent water ingress between the cover member 2*i* and the first waterproofing member 70.

The first waterproofing member 70 is a lip member made of elastic synthetic resin such as NBR, for example. As shown in FIG. 4, the first waterproofing member 70 has a main body portion 71, a third lip portion 73, a first lip portion 72, a grease holding portion 74, and a second lip portion 76. The main body portion 71 is fixed to the second front side inner peripheral portion 2*m* of the cylinder portion 2*e* and has a distal end portion that extends to an inner peripheral side. The third lip portion 73 is a section at which the inner peripheral side distal end portion of the main body portion 71 extends in a radial direction toward the outer peripheral portion of a cap member 33*c* attached to the outer periphery of the boss portion 33*a* of the cylinder portion 30 of the rotor 3. An interstice 75 is formed between the third lip portion 73 and the outer peripheral portion of the cap member 33. The first lip portion 72 is a section at which the inner peripheral side distal end portion of the main body portion 71 is in contact with the outer peripheral portion of the cap member 33*c* in a position on the rear side (the right side in FIG. 4) of the third lip portion 73. The grease holding portion 74 is disposed between the first lip portion 72 and the third lip portion 73 on the outer peripheral portion of the cap member 33*c* and holds grease 90. The second lip portion 76 extends in an axial direction from the front surface of the first lip portion 72 toward the rear surface of the front wall 33 of the cylinder portion 30 of the rotor 3.

As shown in FIG. 4, the outer peripheral portion of the main body portion 71 is placed in contact with the second front side inner peripheral portion 2*m* of the cylinder portion 2*e* and is held between the rear surface of the bottom portion of the cover member 2*i* and the front surface of the step portion between the first front side inner peripheral portion 2*l* and the second front side inner peripheral portion 2*m*. The main body portion 71 covers the entire front side of the roller clutch 51. The inner peripheral side distal end portion of the main body portion 71 branches into two prongs in front and in back and is integrally molded in such a way as to become the third lip portion 73 and the first lip portion 72 that extend inward.

As shown in FIG. 4, the first lip portion 72 and the third lip portion 73 are attached in such a way that their lip distal ends face the front side (the left side in FIG. 4). The first lip portion 72 is placed on the inner peripheral portion on the opposite side (the right side in FIG. 4) of an open side of the second front side inner peripheral portion 2*m*. The third lip portion 73 is placed on the inner peripheral portion on the open side (the left side in FIG. 4) of the second front side inner peripheral portion 2*m* of the cylinder portion 2*e*. The inner peripheral side distal end portion of the first lip portion 72 is in contact with the outer peripheral portion of the cap member 33*c*. The interstice 75 is formed between the inner peripheral side distal end portion of the third lip portion 73 and the outer peripheral portion of the cap member 33*c* of the rotor 3.

As shown in FIG. 4, the grease holding portion 74 is a space between the first lip portion 72 and the third lip portion 73 on the outer peripheral portion of the cap member 33*c*. The grease 90 is injected into the grease holding portion 74 from the inner peripheral side distal end portion of the third lip portion 73. An annular member 91 made of felt impregnated with the grease 90 is attached to the grease holding portion 74. The grease 90 is injected after the annular member 91 has been attached. The grease 90 fills the entire grease holding portion 74, and some of the grease 90 also fills the interstice 75 between the inner peripheral side distal end portion of the third lip portion 73 and the outer peripheral portion of the cap member 33*c*.

As shown in FIG. 3 and FIG. 4, the cap member 33*c* is a tubular collar member attached to the outer peripheral portion of the boss portion 33*a*. The cap member 33*c* is processed in such a way that the surface roughness of its outer peripheral surface, from the outer peripheral surface on the open side (the left side in FIG. 4) to which the third lip portion 73 extends to the outer peripheral surface that becomes the grease holding portion 74, becomes greater (becomes rougher) than the surface roughness of its outer peripheral surface on the opposite side (the right side in FIG. 4) of the open side with which the first lip portion 72 is in contact.

As shown in FIG. 4, the lip distal end of the second lip portion 76 extends along an axis parallel to the spool shaft 15 toward the front side (the left side in FIG. 4). The second lip portion 76 extends along the axial direction from the front surface of the outer peripheral portion of the first lip portion 72 toward the rear surface of the front wall 33 of the cylinder portion 30 of the rotor 3. The distal end portion (the left side end portion in FIG. 4) of the second lip portion 76 is in contact with the rear surface of the front wall 33. The second lip portion 76 is integrally molded with the first lip portion 72. The second lip portion 76 is placed in such a way as to completely cover the outer peripheral surface of the inner peripheral side distal end portion of the first lip portion 72.

The spool 4 is placed between the first rotor arm 31 and the second rotor arm 32 of the rotor 3 and is attached via a drag mechanism 60 to the distal end of the spool shaft 15. The spool 4 has a spool barrel portion 4a, a skirt portion 4b, and flange portion 4c. The fishing line is wound onto the outer periphery of the spool barrel portion 4a. The skirt portion 4b is integrally formed on the rear portion of the spool barrel portion 4a. The flange portion 4c is integrally formed on the front end of the spool barrel portion 4a.

As shown in FIG. 2, the rotor drive mechanism 5 has the handle shaft 10, a drive gear 11, and the pinion gear 12. The handle 1 is non-rotatably attached to the handle shaft 10. The drive gear 11 rotates together with the handle shaft 10. The pinion gear 12 meshes with the drive gear 11.

The pinion gear 12 is a tubular member made of a stainless steel alloy. The front portion 12a of the pinion gear 12 penetrates the center portion of the rotor 3 and is fixed to the rotor 3 by the nut member 13. As shown in FIG. 2 and FIG. 3, the pinion gear 12 has a middle portion 12i and a rear portion 12f that are supported in such a way that they can freely rotate in the reel main body 2 via a first bearing 14a and a second bearing 14b that include rolling bearings.

As shown in FIG. 3, the pinion gear 12 is attached to the reel main body 2 in such a way that the pinion gear 12 can freely rotate about an axis along the axial direction of the fishing rod. The front portion 12a of the pinion gear 12 penetrates the center portion of the rotor 3 and is fixed to the rotor 3 by the nut member 13. The pinion gear 12 has a tubular portion 12b, a tooth portion 12c, and an attachment portion 12d. The spool shaft 15 penetrates the inner peripheral portion of the tubular portion 12b, and an interstice 12e is formed between the inner peripheral portion of the tubular portion 12b and the spool shaft 15. The tooth portion 12c is disposed on the outer periphery of the rear portion 12f of the tubular portion 12b and meshes with the drive gear 11. The attachment portion 12d is disposed on the outer periphery of the front portion 12a of the tubular portion 12b and is non-rotatably attached to the rotor 3.

As shown in FIG. 3, the tubular portion 12b is a tubular member made of a stainless steel alloy. The middle portion 12i and the rear portion 12f are supported in such a way that they can freely rotate in the reel main body 2 via the first bearing 14a and the second bearing 14b, respectively. The spool shaft 15 penetrates the inside of the tubular portion 12b, and the interstice 12e is created between the tubular portion 12b and the spool shaft 15.

As shown in FIG. 3, the tooth portion 12c is formed with helical teeth on the outer periphery of the tubular portion 12b between the middle portion 12i and the rear portion 12f and meshes with the drive gear 11. The tooth portion 12c also meshes with an intermediate gear 20 of the later-described oscillating mechanism 6.

As shown in FIG. 3, the attachment portion 12d is configured by a chamfered portion 12h and an externally threaded portion 12g. The chamfered portion 12h includes a chamfered flat surface on the outer periphery of the front portion 12a of the tubular portion 12b. The externally threaded portion 12g is formed on the front side of the chamfered portion 12h. The attachment portion 12d is non-rotatably attached to the rotor 3. The externally threaded portion 12g is formed on the front side outer peripheral surface of the attachment portion 12d, and the nut member 13 is screwed onto the externally threaded portion 12g. As shown in FIG. 2 and FIG. 3, the nut member 13 is stopped from turning by a retainer 13a. The retainer 13a is fixed to the front wall 33 of the rotor 3 by plural screw members 13b attached from the front.

As shown in FIG. 3, the first bearing 14a and the second bearing 14b are rolling bearings attached to the outer peripheries of the middle portion 12i and the rear portion 12f of the tubular portion 12b. The first bearing 14a has an outer race that is attached to the inner peripheral portion of the cylinder portion 2e and an inner race that is attached to the middle portion 12i formed on the rear side of the section of the tubular portion 12b where the chamfered portion 12h is formed. The second bearing 14b is housed from the front in the bottomed tube-like mounting recess portion 2g. The second bearing 14b has an outer race that is attached to the inner peripheral portion of the mounting recess portion 2g and an inner race that is attached to the rear portion 12f of the tubular portion 12b on the rear side of the tooth portion 12c.

Figure 5:
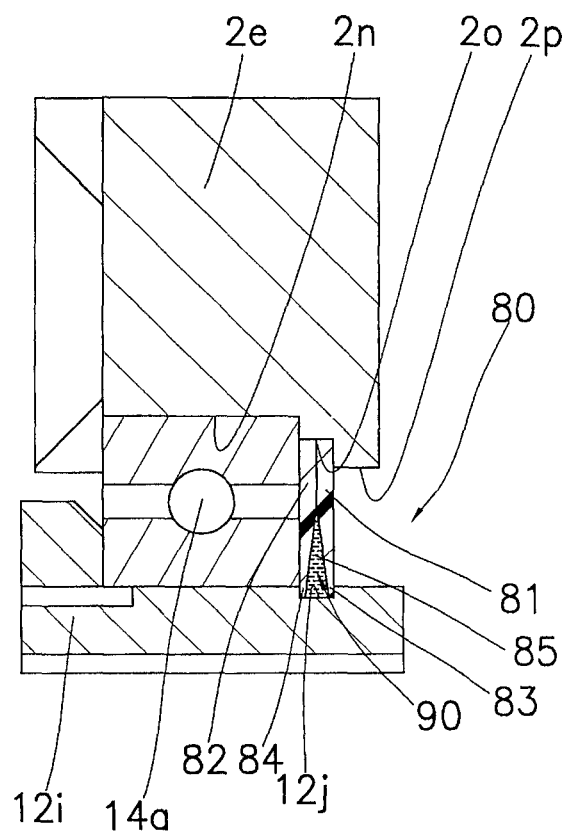
FIG. 5 is an enlarged side sectional view of the environs of a bearing.

As shown in FIG. 3 and FIG. 5, the outer race of the first bearing 14a is attached to a first rear side inner peripheral portion 2n, which is an inner peripheral portion of the cylinder portion 2e. Further, a step portion is created on the rear side (the right side in FIG. 5) of the first rear side inner peripheral portion 2n between a second rear side inner peripheral portion 2o, which is smaller in diameter than the first rear side inner peripheral portion 2n, and a third rear side inner peripheral portion 2p, which is smaller in diameter than the second rear side inner peripheral portion 2o and is a rear end inner peripheral portion of the cylinder portion 2e. A second waterproofing member 80 for waterproofing the first bearing 14a is attached between the rear surface of the outer race of the first bearing 14a and the front surface of the step portion between the second rear side inner peripheral portion 2o and the third rear side inner peripheral portion 2p.

The second waterproofing member 80 is a lip member made of elastic synthetic resin such as NBR, for example. The second waterproofing member 80 is held between the rear surface of the outer race of the first bearing 14a and the front surface of the step portion between the second rear side inner peripheral portion 2o and the third rear side inner peripheral portion 2p. As shown in FIG. 5, the outer peripheral portion of the second waterproofing member 80 is attached to the second rear side inner peripheral portion 2o, which is an inner peripheral portion of the cylinder portion 2e. The inner peripheral portion of the second waterproofing member 80 is in contact with a recess portion 12j recessed in the rear portion outer peripheral portion of the middle portion 12i of the pinion gear 12.

As shown in FIG. 5, the second waterproofing member 80 has a first main body portion 81, a second main body portion 82, a first lip portion 83, a second lip portion 84, and a grease holding portion 95. The first main body portion 81 is fixed on the rear side (the right side in FIG. 5) of the second rear side inner peripheral portion 2o of the cylinder portion 2e and has a distal end portion that extends to the inner peripheral side. The second main body portion 82 is disposed as a body separate from the first main body portion 81 in such a way as to be in contact with the front surface of the first main body portion 81. The second main body portion 82 is fixed on the front side (the left side in FIG. 5) of the second rear side inner peripheral portion 2o of the cylinder portion 2e. The second main body portion 82 has a distal end portion that extends to the inner peripheral side. The first lip portion 83 is integrally molded with the first main body portion 81 and extends in such a way that the inner peripheral side distal end portion of the first main body portion 81 is in contact with the outer peripheral portion of the recess portion 12*j* of the pinion gear 12. The second lip portion 84 is integrally molded with the second main body portion 82 and extends in such a way that the inner peripheral side distal end portion of the second main body 82 is in contact with the outer peripheral portion of the recess portion 12*j* of the pinion gear 12. The grease holding portion 85 is disposed between the first lip portion 83 and the second lip portion 84 on the outer peripheral portion of the recess portion 12*j* of the pinion gear 12 and holds grease 90. The second waterproofing member 80 is configured by two lip members. One lip member includes the first main body portion 81 and the first lip portion 83. Another lip member includes the second main body portion 82 and the second lip portion 84.

As shown in FIG. 5, the front surface of the first main body portion 81 is placed in contact with the rear surface of the second main body portion 82. The rear surface of the first main body portion 81 is in contact with the front surface of the step portion between the second rear side inner peripheral portion 2*o* and the third rear side inner peripheral portion 2*p*. The front surface of the second main body portion 82 is in contact with the rear surface of the outer race of the first bearing 14*a*.

As shown in FIG. 5, the first lip portion 83 is placed on the inner peripheral portion on an open side (the right side in FIG. 5) of the second rear side inner peripheral portion 2*o* of the cylinder portion 2*e*. The second lip portion 84 is placed on the inner peripheral portion on the opposite side (the left side in FIG. 5) of the open side of the second rear side inner peripheral portion 2*o*. The first lip portion 83 is attached in such a way that its lip distal end faces the rear side (the right side in FIG. 5). The second lip portion 84 is attached in such a way that its lip distal end faces the front side (the left side in FIG. 5). The first lip portion 83 is in contact with the outer peripheral portion and the rear side step portion of the recess portion 12*j* of the pinion gear 12. The second lip portion 84 is in contact with the outer peripheral portion and the front side step portion of the recess portion 12*j* of the pinion gear 12.

As shown in FIG. 5, the grease holding portion 85 is a space between the first lip portion 83 and the second lip portion 84 on the outer peripheral portion of the recess portion 12*j* of the pinion gear 12. The grease 90 is injected into the grease holding portion 85 from the inner peripheral side distal end portion of the first lip portion 83.

The outer race of the second bearing 14*b* is in contact only with the inner peripheral portion and part of the bottom portion of the mounting recess portion 2*g*. The inner race of the second bearing 14*b* supports, at its front side section, the outer periphery of the rear portion 12*f* of the tubular portion 12*b* and supports, at its rear side section, the outer periphery of a later-described fourth bearing 14*d* for supporting the spool shaft 15. A slight interstice is created between the inner race of the second bearing 14*b* and the bottom portion of the mounting recess portion 2*g*. For this reason, the inner race of the second bearing 14*b* is not in contact with the bottom portion of the mounting recess portion 2*g*.

As shown in FIG. 2 and FIG. 3, the spool shaft 15 is a shaft member made of a stainless steel alloy. The spool 4 is coupled to the front end portion of the spool shaft 15 via the drag mechanism 60, and a slider 22 of the later-described oscillating mechanism 6 is fixed to the rear end portion of the spool shaft 15. The spool shaft 15 penetrates the inner peripheral portion of the pinion gear 12. The sections of the outer periphery of the spool shaft 15 on the front side of the front portion 12*a* of the tubular portion 12*b* and on the rear side of the rear portion 12*f* of the tubular portion 12*b* are supported in such a way that they can freely rotate by a third bearing 14*c* and a fourth bearing 14*d*, respectively.

As shown in FIG. 3, the third bearing 14*c* is a rolling bearing attached to the outer periphery of the spool shaft 15. The third bearing 14*c* has an outer race that is attached to the front end side inner peripheral portion of the nut member 13 and an inner race that is attached to the outer periphery of the spool shaft 15 on the front side of the front portion 12*a* of the tubular portion 12*b*.

As shown in FIG. 3, the fourth bearing 14*d* is a tubular member made of synthetic resin and is a general-purpose plain bearing such as a bush member. The outer periphery of the fourth bearing 14*d* is attached to the rear end inner peripheral portion of the second bearing 14*b*. The inner periphery of the fourth bearing 14*d* is attached to the outer periphery of the spool shaft 15 on the rear side of the rear portion 12*f* of the tubular portion 12*b*. Here, the second bearing 14*b* supports both the rear portion 12*f* of the tubular portion 12*b* and the fourth bearing 14*d*, so the support structure of the spool shaft 15 becomes simple. Further, the fourth bearing 14*d* is placed in such a way that its rear end portion is positioned on the front side of the rear end portion of the second bearing 14*b*. For this reason, the fourth bearing 14*d* can be placed in front, so the front-and-rear length of the entire support structure of the spool shaft 15 can be shortened.

As shown in FIG. 2, the oscillating mechanism 6 is a mechanism for allowing the spool shaft 15 coupled via the drag mechanism 60 to the center portion of the spool 4 to move in the front-and-rear direction to thereby allow the spool 4 to move in the same direction. The oscillating mechanism 6 is a traverse cam oscillating mechanism. The oscillating mechanism 6 has an intermediate gear 20, a threaded shaft 21, and a slider 22. The intermediate gear 20 meshes with the tooth portion 12*c* of the pinion gear 12. The threaded shaft 21 is attached to the reel body 2*a* in such a way that the threaded shaft 21 can freely rotate about an axis parallel to the spool shaft 15. The slider 22 is moved frontward and rearward by the rotation of the threaded shaft 21. The rear end portion of the spool shaft 15 is mounted on the slider 22 in such a way as to be non-rotatable and immovable in the axial direction.

Next, the operation and actions of the reel will be described in detail.

When casting is performed, the rotor 3 is placed in a state in which it is prevented from reversely rotating by the anti-reverse mechanism 50, and the bail arm 17 is held and reversed to the line release position by hand. In a state in which the bail arm 17 has collapsed to the line release position, the fishing line can be easily paid out from the spool 4.

In this state, the fishing rod is cast while the fishing line is held with the index finger of the hand gripping the fishing rod. Then, the fishing line is released with force because of the weight of the rig.

When the handle 1 is rotated in the line retraction direction in a state in which the bail arm 17 is maintained in the line release position after casting, the rotor 3 is rotated in the line retraction direction by the rotor drive mechanism 5. When the rotor 3 rotates in the line retraction direction, the bail arm 17 is returned to the line retraction position by the bail reversing mechanism 18.

In this spinning reel, the first waterproofing member 70 has the first lip portion 72 and the second lip portion. The first lip portion 72 extends in the radial direction in such a way as to be in contact with the outer peripheral portion of the cap member 33*c* attached to the outer periphery of the boss portion 33*a* of the cylinder portion 30 of the rotor 3. The second lip portion 76 extends in the axial direction from the front surface of the first lip portion 72 toward the rear surface of the front wall 33 of the cylinder portion 30 of the rotor 3. Here, even if a large amount of water flows into the interstice between the rear surface of the front wall 33 of the cylinder portion 30 of the rotor 3 disposed on the front portion of the cylinder portion 2e and the front surface of the first waterproofing member 70, the water pressure acting on the first lip portion 72 can be reduced by the second lip portion 76 that extends in the axial direction from the front surface of the first lip portion 72 toward the rear surface of the front wall 33, so the waterproofing performance of the first waterproofing member 70 can be improved.

Other Embodiments in the First Embodiment (a) In the above-described embodiment, a front drag spinning reel is taken as an example and described, but the present invention can be applied to all forms of spinning reels.

Figure 6:
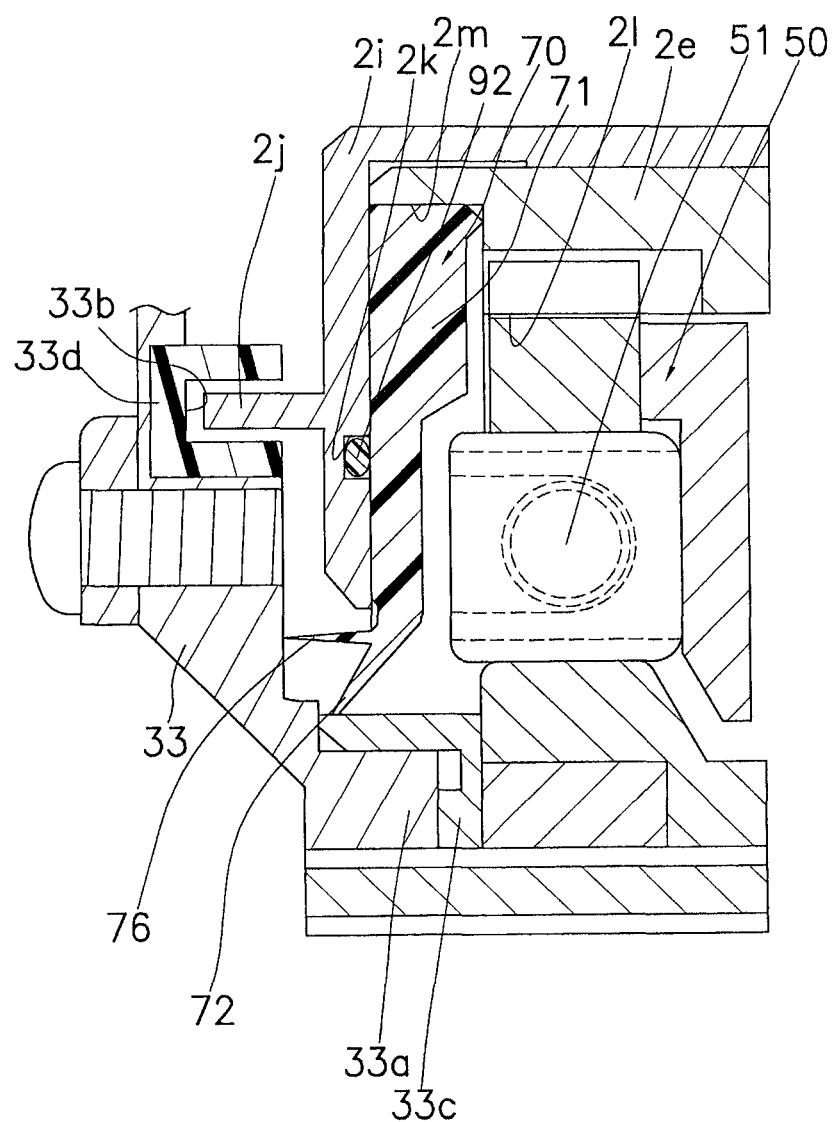
FIG. 6 is a view corresponding to FIG. 4 of another embodiment in the first embodiment.

(b) In the above-described embodiment, the first waterproofing member 70 has a configuration where the third lip portion 73, the grease holding portion 74, the interstice 75, the grease 90, and the annular member 91 are disposed, but as shown in FIG. 6 the first waterproofing member 70 can also be given a configuration where the third lip portion 73, the grease holding portion 74, the interstice 75, the grease 90, and the annular member 91 are not disposed but the main body portion 71, the first lip portion 72, and the second lip portion 76 are disposed. In FIG. 6, the first lip portion 72 of the first waterproofing member 70 is in contact with the outer peripheral portion of the cap member 33c of the rotor 3, but the first lip portion 72 can also be given a configuration where an interstice is disposed between the first lip portion 72 and the outer peripheral portion of the cap member 33c of the rotor 3.

(c) In the above-described embodiment, the second lip portion 76 extends along an axis parallel to the spool shaft 15, but the second lip portion 76 is not limited to this. It suffices for the second lip portion 76 to extend in the axial direction toward the rear surface of the front wall 33. Further, the distal end portion of the second lip portion 76 is in contact with the rear surface of the front wall 33, but the second lid portion 76 can also be given a configuration where an interstice is disposed between the distal end portion of the second lip portion 76 and the rear surface of the front wall 33.

Figure 7:
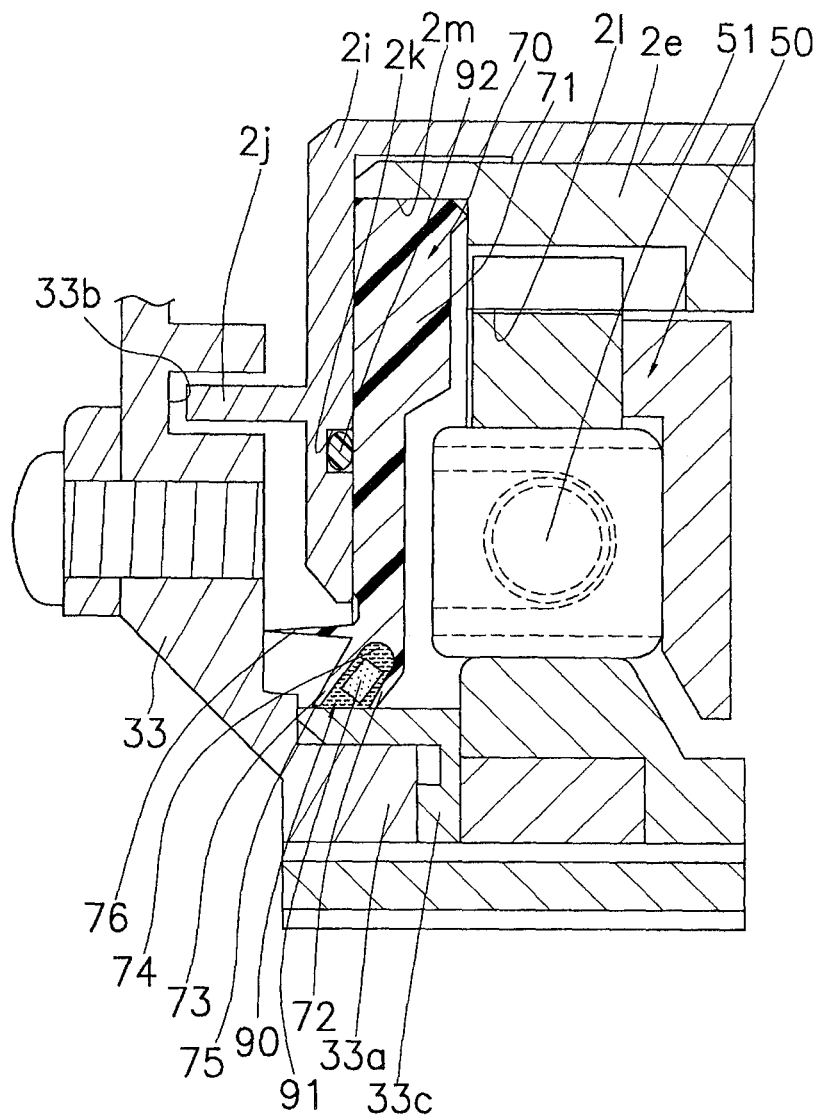
FIG. 7 is a view corresponding to FIG. 4 of another embodiment in the first embodiment.

(d) In the above-described embodiment, the rubber member 33d that is a body separate from the front wall 33 is disposed and the recess portion 33b is formed in the rubber member 33d, but as shown in FIG. 7 the recess portion 33b can also be formed in the front wall 33. Further, the shape of the rubber member 33d is not limited to the shape in the above-described embodiment. The rubber member 33d can be formed in an arbitrary shape as long as the shape is one into which the projecting portion 2j is inserted and can configure a labyrinth structure. Further, the material of the rubber member 33d is not limited to rubber. Further, the method of fixing the rubber member 33d is not limited to the rubber member 33d being fastened with screws.

Second Embodiment

Figure 8:
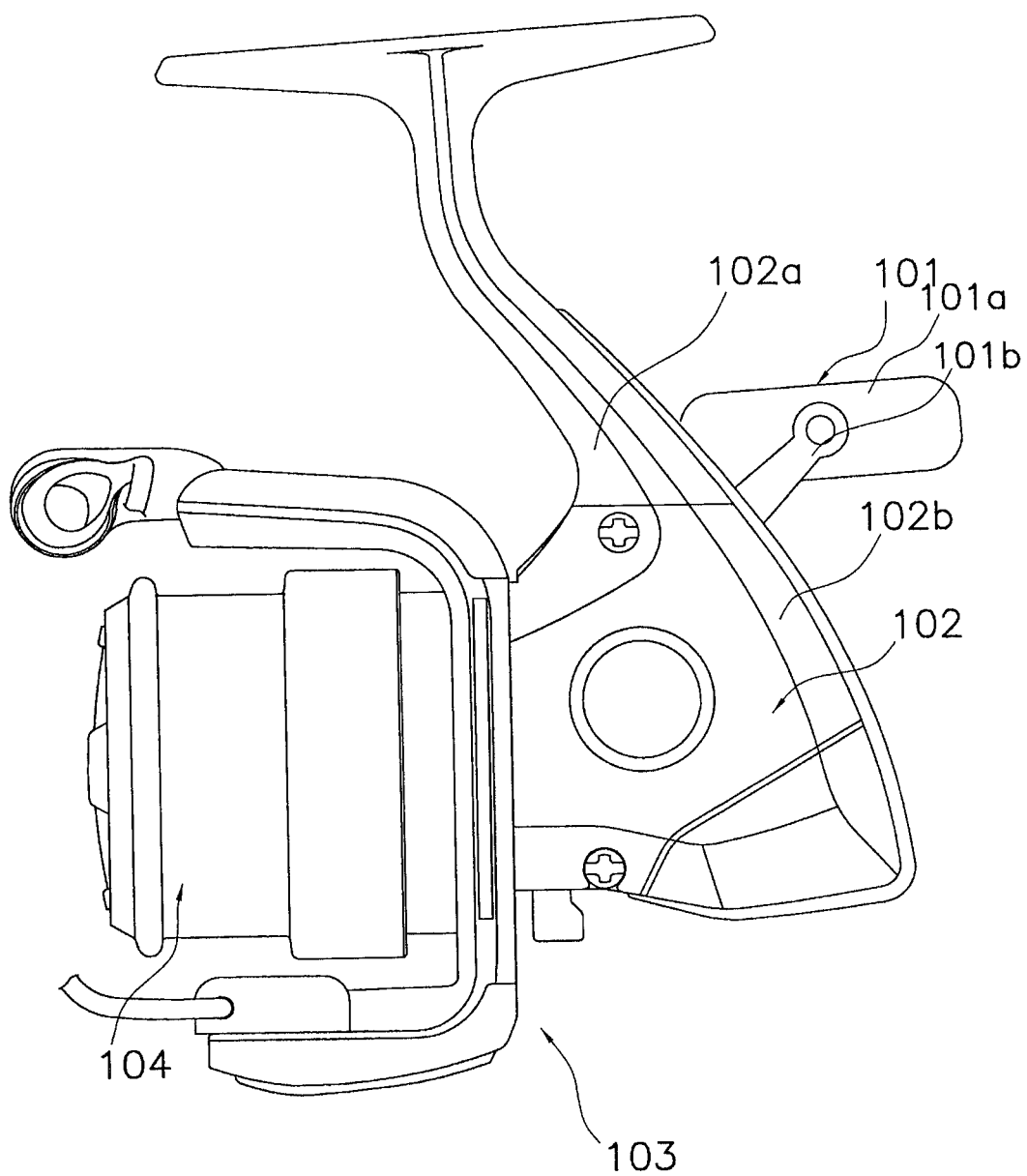
FIG. 8 is a left side view of a spinning reel employing a second embodiment of the present invention.
Figure 9:
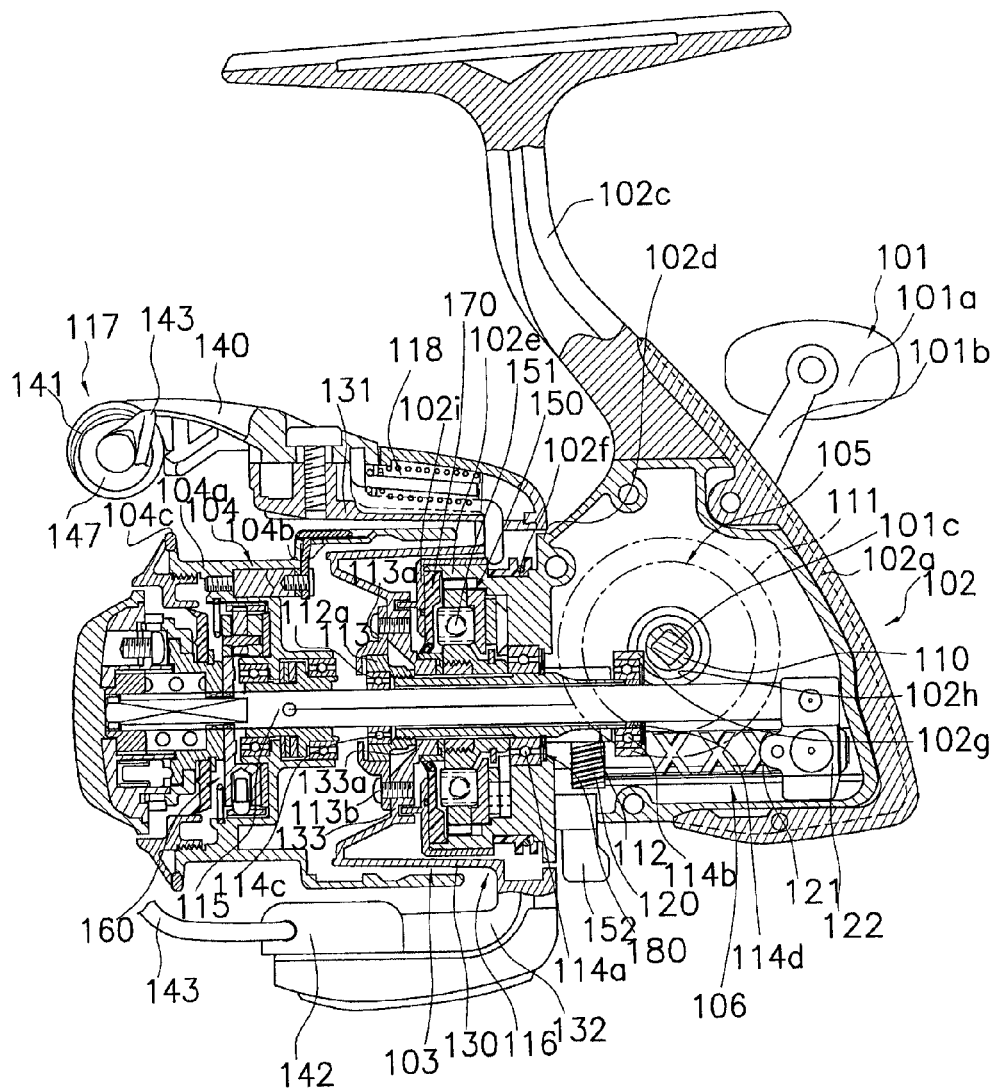
FIG. 9 is a left side sectional view of the spinning reel.

As shown in FIG. 8 and FIG. 9, a spinning reel of this embodiment of the present invention is equipped with a handle 101, a reel main body 102 that supports the handle 101 in such a way that the handle 101 can freely rotate, a rotor 103, and a spool 104. The rotor 103 is supported on the front portion of the reel main body 102 in such a way that the rotor 103 can freely rotate. The spool 104 retracts a fishing line onto its outer peripheral surface and is placed on the front portion of the rotor 103 in such a way that the spool 104 can freely move frontward and rearward. In FIG. 8 the handle 101 is attached to the left side of the reel main body 102, and in FIG. 9 the handle 101 is attached to the right side of the reel main body 102. In this way, the handle 101 can be attached to either the left side or the right side of the reel main body 102.

The handle 101 has a T-shaped handle knob 101a and a handle arm 101b. The handle knob 101a is attached to the distal end of the handle arm 101b in such a way that the handle knob 101a can freely rotate. The handle 101 further has a handle shaft portion 101c on the proximal end portion of the handle arm 101b. The handle shaft portion 101c is extending in a direction intersecting the handle arm 101b and is non-rotatably attached to a later-described handle shaft 110.

The reel main body 102 has a reel body 102a and a covering member 102b. The reel body 102a has a space inside, and the covering member 102b is detachably attached to the reel body 102a in order to close off the space in the reel body 102a.

The reel body 102a is made of aluminum alloy, for example. A T-shaped rod mounting foot 102c that extends frontward and rearward is integrally formed on the upper portion of the reel body 102a. As shown in FIG. 9, a rotor drive mechanism 105 that causes the rotor 103 to rotate in conjunction with the rotation of the handle 101 and an oscillating mechanism 106 for causing the spool 104 to move frontward and rearward to uniformly retract the fishing line are disposed in the space in the reel body 102a. A circular flange portion 102d and a cylinder portion 102e are formed on the front end of the reel body 102a and the covering member 102b. The cylinder portion 102e is smaller in diameter than the flange portion 102d and has a distal end that is open. An attachment groove 102f whose cross section is cut out in a circular shape is formed in the cylinder portion 102e.

Figure 10:
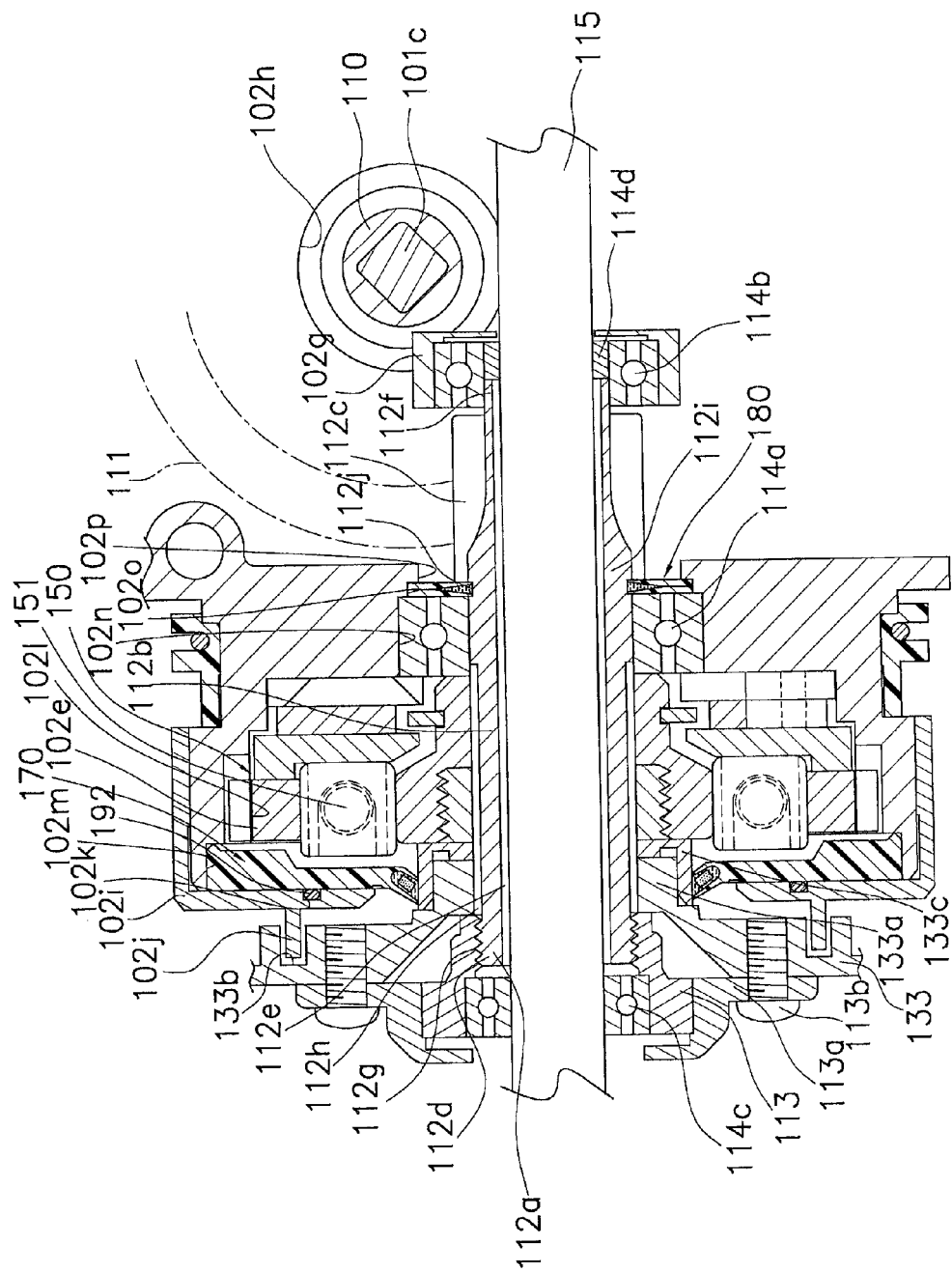
FIG. 10 is an enlarged side sectional view of the environs of a pinion gear.

As shown in FIG. 9 and FIG. 10, a bottomed tube-like mounting recess portion 102g is formed on the side portion of the reel body 102a. A later-described spool shaft 115 penetrates the mounting recess portion 102g, and the mounting recess portion 102g can house a later-described second bearing 114b from the front. The mounting recess portion 102g is a boss portion being open at a front portion thereof. The mounting recess portion 2g has, in the center of its rear portion, a bottom portion at which is a through hole is formed. The spool shaft 115 penetrates the through hole. The mounting recess portion 102g is formed by T-slot cutting a sidewardly projecting section of the reel body 102a. Further, unillustrated circular through holes through which the handle shaft 110 can be inserted are formed in the side portions of the reel body 102a and the covering member 102b. Attachment recess portions 102h are recessed around the through holes in the inside surfaces of the reel body 102a and the covering member 102b. The attachment recess portions 102h can house unillustrated rolling bearings that support the handle shaft 110 in such a way that the handle shaft 110 can freely rotate. Here, the mounting recess portions 102g are formed by T-slot cutting, so the attachment recess portions 102h can be placed in positions in which parts of the rear end portions of the mounting recess portions 102g overlap the attachment recess portions 102h as seen from the side. For this reason, it becomes unnecessary to administer processing that cuts out parts of the rear end portions of the mounting recess portions 102g, and the withstand load acting on the rolling bearings can be increased because the rolling bearings that support the handle shaft 110 can be enlarged because the attachment recess portions 102h can be increased in diameter.

The covering member 102b is a member made of aluminum alloy, for example, and is fastened with screws to the reel body 102a in three places, for example.

As shown in FIG. 9, the rotor 103 has a rotor main body 116, a bail arm 117, and a bail reversing mechanism 118. The bail arm 117 is attached to the distal end of the rotor main body 116 in such a way that the bail arm 117 can freely swing between a line release position and a line retraction position. The bail reversing mechanism 118 is attached to the rotor main body 116 in order to return the bail arm 117 from the line release position to the line retraction position.

The rotor main body 116 has a cylinder portion 130, a first rotor arm 131, and a second rotor arm 132. The cylinder portion 130 is attached to the reel body 102a in such a way that the cylinder portion 130 can freely rotate about the spool shaft 115. The first rotor arm 131 and the second rotor arm 132 are disposed opposing each other on the sides of the cylinder portion 130. The cylinder portion 130, the first rotor arm 131, and the second rotor arm 132 are made of aluminum alloy, for example, and are integrally molded.

A front wall 133 is formed on the front portion of the cylinder portion 130, and a boss portion 133a is formed in the central portion of the front wall 133. A through hole is formed in the center portion of the boss portion 133a, and a front portion 112a of a pinion gear 112 and the spool shaft 115 penetrate this through hole. A nut member 113 for fixing the rotor 103 is placed on the front portion of the front wall 133.

A first bail support member 140 is attached to the outer peripheral side of the distal end of the first rotor arm 131 in such a way that the first bail support member 140 can freely swing. A second bail support member 142 is attached to the inner peripheral side of the distal end of the second rotor arm 132 in such a way that the second bail support member 142 can freely swing. A line roller 141 for guiding the fishing line to the spool 104 and a fixing shaft cover 147 that is fixed to the first bail support member 140 with the line roller 141 in between are attached to the distal end of the first bail support member 140. The line roller 141 is attached to the distal end of the first bail support member 140 in such a way that the line roller 141 can freely rotate. The fixing shaft cover 147 has a transformed cone shape whose distal end is pointed. A bail 143 having a shape obtained by curving wire rod into a substantial U shape is fixed between the distal end portion of the fixing shaft cover 147 and the second bail support member 142. The bail arm 117 that guides the fishing line to the spool 104 is configured by the first bail support member 140, the second bail support member 142, the line roller 141, the bail 143, and the fixing shaft cover 147.

The bail reversing mechanism 118 is placed inside a housing space in the first rotor arm 131. The bail reversing mechanism 118 is disposed for causing the bail arm 117 to return from the line release position to the line retraction position in conjunction with the rotation of the rotor 103 and for holding the state of the bail arm 117 in both positions.

As shown in FIG. 9, an anti-reverse mechanism 150 for prohibiting the reverse rotation of the rotor 103 and cancelling the prohibition is placed inside the cylinder portion 130 of the rotor 103. The anti-reverse mechanism 150 has a roller clutch 151 and a stopper 152. The roller clutch 151 is a roller one-way clutch attached to the inner peripheral portion of the cylinder portion 102e. The stopper 152 is placed on the lower portion of the reel body 102a and switches the roller clutch 151 between an actuated state and a non-actuated state. The roller clutch 151 has an outer race that is attached to the inner peripheral side of the cylinder portion 102e and an inner race that is attached to the outer peripheral portion of the pinion gear 112. Here, by swinging the stopper 152 left and right, the roller clutch 151 is switched between the actuated state and the non-actuated state.

Figure 11:
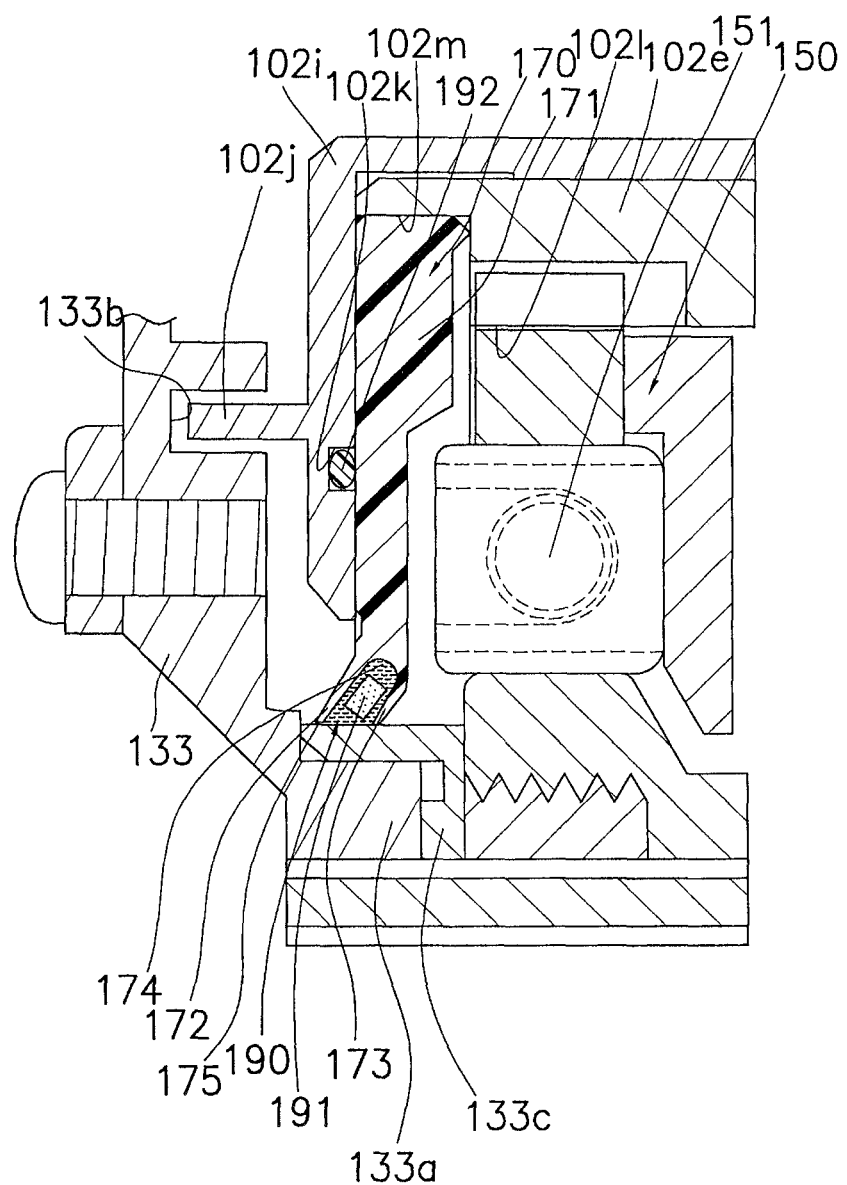
FIG. 11 is an enlarged side sectional view of the environs of a roller clutch.

As shown in FIG. 10 and FIG. 11, the roller clutch 151 is attached to a first front side inner peripheral portion 102l, which is an inner peripheral portion of the cylinder portion 102e. A first waterproofing member 170 for waterproofing the roller clutch 151 is attached to a second front side inner peripheral portion 102m. The second front side inner peripheral portion 102m is placed on the front side (the left side in FIG. 11) of the first front side inner peripheral portion 102l and is the front end inner peripheral portion of the cylinder portion 102e that becomes a stepped recess portion that is larger in diameter than the first front side inner peripheral portion 102l. A bottomed tube-like cover member 102i for covering the front side of the roller clutch 151 is attached to the outer periphery of the front end portion of the cylinder portion 102e. The first waterproofing member 170 is held between the rear surface of the bottom portion of the cover member 102i and the front surface of the step portion between the first front side inner peripheral portion 102l and the second front side inner peripheral portion 102m, whereby the first waterproofing member 170 is fixed to the cylinder portion 102e.

As shown in FIG. 11, the cover member 102i has a cylindrical projecting portion 102j and a recess portion 102k. The projecting portion 102j projects frontward from the front surface of the bottom portion of the cover member 102i. The recess portion 102k is formed as a result of the rear surface of the bottom portion of the cover member 102i, with which the front surface of the first waterproofing member 170 is in contact, being annularly recessed. The projecting portion 102j is inserted into a recess portion 133b. The recess portion 133b is formed as a result of the rear surface of the front wall 133 of the cylinder portion 130 of the rotor 103 being annularly recessed. Here, a labyrinth structure is formed by the recess portion 133b and the projecting portion 102j, so it is difficult for water to come inside. Further, an O-ring 192 made of synthetic resin is attached to the recess portion 102k, and the O-ring 192 can prevent water ingress between the cover member 102i and the first waterproofing member 170.

The first waterproofing member 170 is a lip member made of elastic synthetic resin such as NBR, for example. As shown in FIG. 11, the first waterproofing member 170 has a main body portion 171, a first lip portion 172, a second lip portion 173, and a grease holding portion 174. The main body portion 171 is fixed to the second front side inner peripheral portion 102m of the cylinder portion 102e and has a distal end portion that extends to an inner peripheral side. The first lip portion 172 is a section at which the inner peripheral side distal end portion of the main body portion 171 extends toward the outer peripheral portion of a cap member 133c attached to the outer periphery of the boss portion 133a of the cylinder portion 130 of the rotor 103. An interstice 175 is formed between the first lip portion 172 and the outer peripheral portion of the cap member 133c. The second lip portion 173 is a section at which the inner peripheral side distal end portion of the main body portion 171 is in contact with the outer peripheral portion of the cap member 133c in a position on the rear side (the right side in FIG. 11) of the first lip portion 172. The grease holding portion 174 is disposed between the first lip portion 172 and the second lip portion 173 on the outer peripheral portion of the cap member 133c and holds grease 190.

As shown in FIG. 11, the outer peripheral portion of the main body portion 171 is placed in contact with the second front side inner peripheral portion 102m of the cylinder portion 102e and is held between the rear surface of the bottom portion of the cover member 102i and the front surface of the step portion between the first front side inner peripheral portion 102l and the second front side inner peripheral portion 102m. The main body portion 171 covers the entire front side of the roller clutch 151. The inner peripheral side distal end portion of the main body portion 171 is divided into two prongs in front and in back and is integrally molded in such a way as to become the first lip portion 172 and the second lip portion 173 that extend inward.

As shown in FIG. 11, the first lip portion 172 and the second lip portion 173 are attached in such a way that their lip distal ends face the front side (the left side in FIG. 11). The first lip portion 172 is placed on the inner peripheral portion of an open side (the left side in FIG. 11) of the second front side inner peripheral portion 102m of the cylinder portion 102e. The second lip portion 173 is placed on the inner peripheral portion on the opposite side (the right side in FIG. 11) of the open side of the second front side inner peripheral portion 102m. The interstice 175 is formed between the inner peripheral side distal end portion of the first lip portion 172 and the outer peripheral portion of the cap member 133c of the rotor 103. The inner peripheral side distal end portion of the second lip portion 173 is in contact with the outer peripheral portion of the cap member 133c.

As shown in FIG. 11, the grease holding portion 174 is a space between the first lip portion 172 and the second lip portion 173 on the outer peripheral portion of the cap member 133c. The grease 190 is injected into the grease holding portion 174 from the inner peripheral side distal end portion of the first lip portion 172. An annular member 191 made of felt impregnated with the grease 190 is attached to the grease holding portion 174. The grease 190 is injected after the annular member 191 has been attached. The grease 190 fills the entire grease holding portion 174, and some of the grease 190 also fills the interstice 175 between the inner peripheral side distal end portion of the first lip portion 172 and the outer peripheral portion of the cap member 133c.

As shown in FIG. 10 and FIG. 11, the cap member 133c is a tubular collar member attached to the outer peripheral portion of the boss portion 133a. The cap member 133c is processed in such a way that the surface roughness of its outer peripheral surface, from the outer peripheral surface on the open side (the left side in FIG. 11) to which the first lip portion 172 extends to the outer peripheral surface that becomes the grease holding portion 174, becomes greater (becomes rougher) than the surface roughness of its outer peripheral surface on the opposite side (the right side in FIG. 11) of the open side with which the second lip portion 173 is in contact.

The spool 104 is placed between the first rotor arm 131 and the second rotor arm 132 of the rotor 103 and is attached via a drag mechanism 160 to the distal end of the spool shaft 115. The spool 104 has a spool barrel portion 104a, a skirt portion 104b, and a flange portion 104c. The fishing line is wound onto the outer periphery of the spool barrel portion 104a. The skirt portion 104b is integrally formed on the rear portion of the spool barrel portion 104a. The flange portion 104c is integrally formed on the front end of the spool barrel portion 104a.

As shown in FIG. 9, the rotor drive mechanism 105 has the handle shaft 110, a drive gear 111, and the pinion gear 112. The handle 101 is non-rotatably attached to the handle shaft 110. The drive gear 111 rotates together with the handle shaft 110. The pinion gear 112 meshes with the drive gear 111.

The pinion gear 112 is a tubular member made of a stainless steel alloy. The front portion 112a of the pinion gear 112 penetrates the center portion of the rotor 103 and is fixed to the rotor 103 by the nut member 113. As shown in FIG. 9 and FIG. 10, the pinion gear 112 has a middle portion 112i and a rear portion 112f that are supported in such a way that they can freely rotate in the reel main body 102 via a first bearing 114a and a second bearing 114b that include rolling bearings.

As shown in FIG. 10, the pinion gear 112 is attached to the reel main body 102 in such a way that the pinion gear 112 can freely rotate about an axis along the axial direction of the fishing rod. The front portion 112a of the pinion gear 112 penetrates the center portion of the rotor 103 and is fixed to the rotor 103 by the nut member 113. The pinion gear 112 has a tubular portion 112b, a tooth portion 112c, and an attachment portion 112d. The spool shaft 115 penetrates the inner peripheral portion of the tubular portion 112d, and an interstice 112e is formed between the inner peripheral portion of the tubular portion 112b and the spool shaft 115. The tooth portion 112c is disposed on the outer periphery of the rear portion 112f of the tubular portion 112b and meshes with the drive gear 111. The attachment portion 112d is disposed on the outer periphery of the front portion 112a of the tubular portion 112b and is non-rotatably attached to the rotor 103.

As shown in FIG. 10, the tubular portion 112b is a tubular member made of a stainless steel alloy. The middle portion 112i and the rear portion 112f are supported in such a way that they can freely rotate in the reel main body 102 via the first bearing 114a and the second bearing 114b, respectively. The spool shaft 115 penetrates the inside of the tubular portion 112b, and the interstice 112e is created between the tubular portion 112b and the spool shaft 115.

As shown in FIG. 10, the tooth portion 112c is formed with helical teeth on the outer periphery of the tubular portion 112b between the middle portion 112i and the rear portion 112f and meshes with the drive gear 111. The tooth portion 112c also meshes with an intermediate gear 120 of the later-described oscillating mechanism 106.

As shown in FIG. 10, the attachment portion 112d is configured by a chamfered portion 112h and an externally threaded portion 112g. The chamfered portion 112h includes a chamfered flat surface on the outer periphery of the front portion 112a of the tubular portion 112b. The externally threaded portion 112g is formed on the front side of the chamfered portion 112h. The attachment portion 112d is non-rotatably attached to the rotor 103. The externally threaded portion 112g is formed on the front side outer peripheral surface of the attachment portion 112d, and the nut member 113 is screwed onto the externally threaded portion 112g. As shown in FIG. 9 and FIG. 10, the nut member 113 is stopped from turning by a retainer 113a. The retainer 113a is fixed to the front wall 133 of the rotor 103 by plural screw members 113b attached from the front.

As shown in FIG. 10, the first bearing 114a and the second bearing 114b are rolling bearings attached to the outer peripheries of the middle portion 112i and the rear portion 112f of the tubular portion 112b. The first bearing 114a has an outer race that is attached to the inner peripheral portion of the cylinder portion 102e and an inner race that is attached to the middle portion 112i formed on the rear side of the section of the tubular portion 112b where the chamfered portion 112h is formed. The second bearing 114b is housed from the front in the bottomed tube-like mounting recess portion 102g. The second bearing 114b has an outer race that is attached to the inner peripheral portion of the mounting recess portion 102g and an inner race that is attached to the rear portion 112f of the tubular portion 112b on the rear side of the tooth portion 112c.

Figure 12:
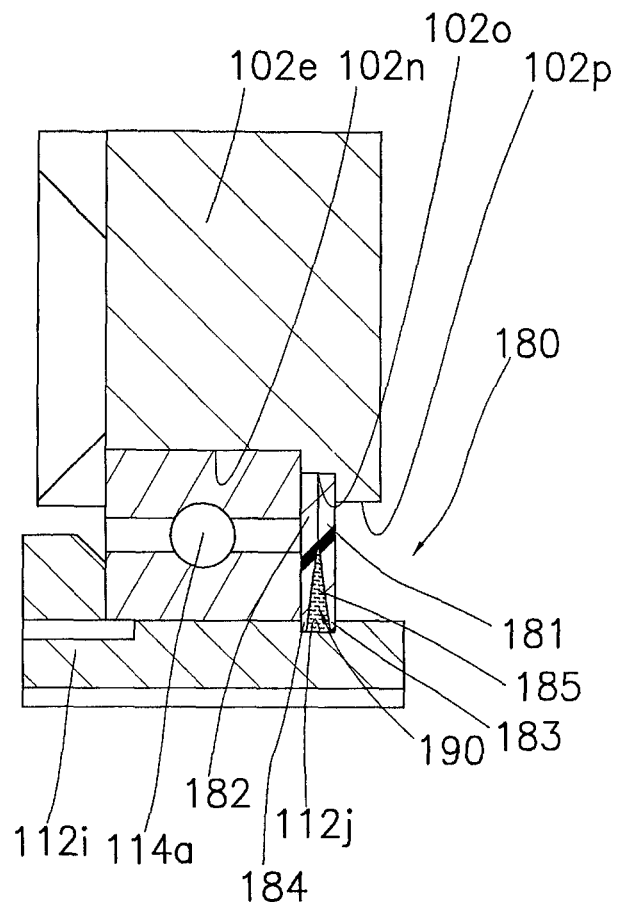
FIG. 12 is an enlarged side sectional view of the environs of a bearing.

As shown in FIG. 10 and FIG. 12, the outer race of the first bearing 114a is attached to a first rear side inner peripheral portion 102n, which is an inner peripheral portion of the cylinder portion 102e. Further, a step portion is created on the rear side (the right side in FIG. 12) of the first rear side inner peripheral portion 102n between a second rear side inner peripheral portion 102o, which is smaller in diameter than the first rear side inner peripheral portion 102n, and a third rear side inner peripheral portion 102p, which is smaller in diameter than the second rear side inner peripheral portion 102o and is a rear end inner peripheral portion of the cylinder portion 102e. A second waterproofing member 180 for waterproofing the first bearing 114a is attached between the rear surface of the outer race of the first bearing 114a and the front surface of the step portion between the second rear side inner peripheral portion 102o and the third rear side inner peripheral portion 102p.

The second waterproofing member 180 is a lip member made of elastic synthetic resin such as NBR, for example. The second waterproofing member 180 is held between the rear surface of the outer race of the first bearing 114a and the front surface of the step portion between the second rear side inner peripheral portion 102o and the third rear side inner peripheral portion 102p. As shown in FIG. 12, the outer peripheral portion of the second waterproofing member 180 is attached to the second rear side inner peripheral portion 102o, which is an inner peripheral portion of the cylinder portion 102e. The inner peripheral portion of the second waterproofing member 180 is in contact with a recess portion 112j recessed in the rear portion outer peripheral portion of the middle portion 112i of the pinion gear 112.

As shown in FIG. 12, the second waterproofing member 180 has a first main body portion 181, a second main body portion 182, a first lip portion 183, a second lip portion 184, and a grease holding portion 185. The first main body portion 181 is fixed on the rear side (the right side in FIG. 12) of the second rear side inner peripheral portion 102o of the cylinder portion 102e and has a distal end portion that extends to the inner peripheral side. The second main body portion 182 is disposed as a body separate from the first main body portion 181 in such a way as to be in contact with the front surface of the first main body portion 181, is fixed on the front side (the left side in FIG. 12) of the second rear side inner peripheral portion 102o of the cylinder portion 102e, and has a distal end portion that extends to the inner peripheral side. The first lip portion 183 is integrally molded with the first main body portion 181 and extends in such a way that the inner peripheral side distal end portion of the first main body portion 181 is in contact with the outer peripheral portion of the recess portion 112j of the pinion gear 112. The second lip portion 184 is integrally molded with the second main body portion 182 and extends in such a way that the inner peripheral side distal end portion of the second main body portion 182 is in contact with the outer peripheral portion of the recess portion 112j of the pinion gear 112. The grease holding portion 185 is disposed between the first lip portion 183 and the second lip portion 184 on the outer peripheral portion of the recess portion 112j of the pinion gear 112 and holds grease 190. The second waterproofing member 180 is configured by two lip members: the lip member including the first main body portion 181 and the first lip portion 183 and the lip member including the second main body portion 182 and the second lip portion 184.

As shown in FIG. 12, the front surface of the first main body portion 181 is placed in contact with the rear surface of the second main body portion 182. The rear surface of the first main body portion 181 is in contact with the front surface of the step portion between the second rear side inner peripheral portion 102o and the third rear side inner peripheral portion 102p. The front surface of the second main body portion 182 is in contact with the rear surface of the outer race of the first bearing 114a.

As shown in FIG. 12, the first lip portion 183 is placed on the inner peripheral portion on an open side (the right side in FIG. 12) of the second rear side inner peripheral portion 102o of the cylinder portion 102e. The second lip portion 184 is placed on the inner peripheral portion on the opposite side (the left side in FIG. 12) of the open side of the second rear side inner peripheral portion 102o. The first lip portion 183 is attached in such a way that its lip distal end faces the rear side (the right side in FIG. 12). The second lip portion 184 is attached in such a way that its lip distal end faces the front side (the left side in FIG. 12). The first lip portion 183 is in contact with the outer peripheral portion and the rear side step portion of the recess portion 112j of the pinion gear 112. The second lip portion 184 is in contact with the outer peripheral portion and the front side step portion of the recess portion 112j of the pinion gear 112.

As shown in FIG. 12, the grease holding portion 185 is a space between the first lip portion 183 and the second lip portion 184 on the outer peripheral portion of the recess portion 112j of the pinion gear 112. The grease 190 is injected into the grease holding portion 185 from the inner peripheral side distal end portion of the first lip portion 183.

The outer race of the second bearing 114b is in contact only with the inner peripheral portion and part of the bottom portion of the mounting recess portion 102g. The inner race of the second bearing 114b supports, at its front side section, the outer periphery of the rear portion 112f of the tubular portion 112b and supports, at its rear side section, the outer periphery of a later-described fourth bearing 114d for supporting the spool shaft 115. A slight interstice is created between the inner race of the second bearing 114b and the bottom portion of the mounting recess portion 102g. For this reason, the inner race of the second bearing 114b is not in contact with the bottom portion of the mounting recess portion 102g.

As shown in FIG. 9 and FIG. 10, the spool shaft 115 is a shaft member made of a stainless steel alloy. The spool 104 is coupled to the front end portion of the spool shaft 115 via the drag mechanism 160, and a slider 122 of the later-described oscillating mechanism 106 is fixed to the rear end portion of the spool shaft 115. The spool shaft 115 penetrates the inner peripheral portion of the pinion gear 112. The sections of the outer periphery of the spool shaft 115 on the front side of the front portion 112a of the tubular portion 112b and on the rear side of the rear portion 112f of the tubular portion 112b are supported in such a way that they can freely rotate by a third bearing 114c and a fourth bearing 114d, respectively.

As shown in FIG. 10, the third bearing 114c is a rolling bearing attached to the outer periphery of the spool shaft 115. The third bearing 114c has an outer race that is attached to the front end side inner peripheral portion of the nut member 113 and an inner race that is attached to the outer periphery of the spool shaft 115 on the front side of the front portion 112a of the tubular portion 112b.

As shown in FIG. 10, the fourth bearing 114d is a tubular member made of synthetic resin and is a general-purpose plain bearing such as a bush member. The outer periphery of the fourth bearing 114d is attached to the rear end inner peripheral portion of the second bearing 114b. The inner periphery of the fourth bearing 114d is attached to the outer periphery of the spool shaft 115 on the rear side of the rear portion 112f of the tubular portion 112b. Here, the second bearing 114b supports both the rear portion 112f of the tubular portion 112b and the fourth bearing 114d, so the support structure of the spool shaft 115 becomes simple. Further, the fourth bearing 114d is placed in such a way that its rear end portion is positioned on the front side of the rear end portion of the second bearing 114b. For this reason, the fourth bearing 114d can be placed in front, so the front-and-rear length of the entire support structure of the spool shaft 115 can be shortened.

As shown in FIG. 9, the oscillating mechanism 106 is a mechanism for allowing the spool shaft 115 coupled via the drag mechanism 160 to the center portion of the spool 104 to move in the front-and-rear direction to thereby allow the spool 104 to move in the same direction. The oscillating mechanism 106 is a traverse cam oscillating mechanism. The oscillating mechanism 106 has an intermediate gear 120, a threaded shaft 121, and a slider 122. The intermediate gear 120 meshes with the tooth portion 112c of the pinion gear 112. The threaded shaft 121 is attached to the reel body 102a in such a way that the threaded shaft 121 can freely rotate about an axis parallel to the spool shaft 115. The slider 122 is moved frontward and rearward by the rotation of the threaded shaft 121. The rear end portion of the spool shaft 115 is mounted on the slider 122 in such a way as to be non-rotatable and immovable in the axial direction.

Next, the operation and actions of the reel will be described in detail.

When casting is performed, the rotor 103 is placed in a state in which it is prevented from reversely rotating by the anti-reverse mechanism 150, and the bail arm 117 is held and reversed to the line release position by hand. In a state in which the bail arm 117 has collapsed to the line release position, the fishing line can be easily paid out from the spool 104.

In this state, the fishing rod is cast while the fishing line is held with the index finger of the hand gripping the fishing rod. Then, the fishing line is released with force because of the weight of the rig.

When the handle 101 is rotated in the line retraction direction in a state in which the bail arm 117 is maintained in the line release position after casting, the rotor 103 is rotated in the line retraction direction by the rotor drive mechanism 105. When the rotor 103 rotates in the line retraction direction, the bail arm 117 is returned to the line retraction position by the bail reversing mechanism 118.

In this spinning reel, the first waterproofing member 170 has the first lip portion 172, the second lip portion 173 that is in contact with the outer peripheral portion of the cap member 133c of the rotor 103, and the grease holding portion 174 that is disposed between the first lip portion 172 and the second lip portion 173 on the outer peripheral portion of the cap member 133c and holds the grease 190. Further, the second waterproofing member 180 has the first lip portion 183, the second lip portion 184 that is in contact with the outer peripheral portion of pinion gear 112, and the grease holding portion 185 that is disposed between the first lip portion 183 and the second lip portion 184 on the outer peripheral portion of the pinion gear 112 and holds the grease 190. Here, the second lip portion 173 of the first waterproofing member 170 and the second lip portion 184 of the second waterproofing member 180 are in contact with the outer peripheral portions of the cap member 133c of the rotor 103 and the pinion gear 112, so it becomes more difficult for the rotational friction of the cap member 133c and the pinion gear 112 to increase compared to the well-known configuration. Moreover, here, the grease 190 is held in the grease holding portion 174 disposed between the first lip portion 172 and the second lip portion 173 on the outer peripheral portion of the cap member 133c and in the grease holding portion 185 disposed between the first lip portion 183 and the second lip portion 184 on the outer peripheral portion of the pinion gear 112, so the waterproofing performance of the roller clutch 151 and the first bearing 114a can be improved.

Other Embodiments in the Second Embodiment (a) In the above-described embodiment, a front drag spinning reel is taken as an example and described, but the present invention can be applied to all forms of spinning reels.

Figure 13:
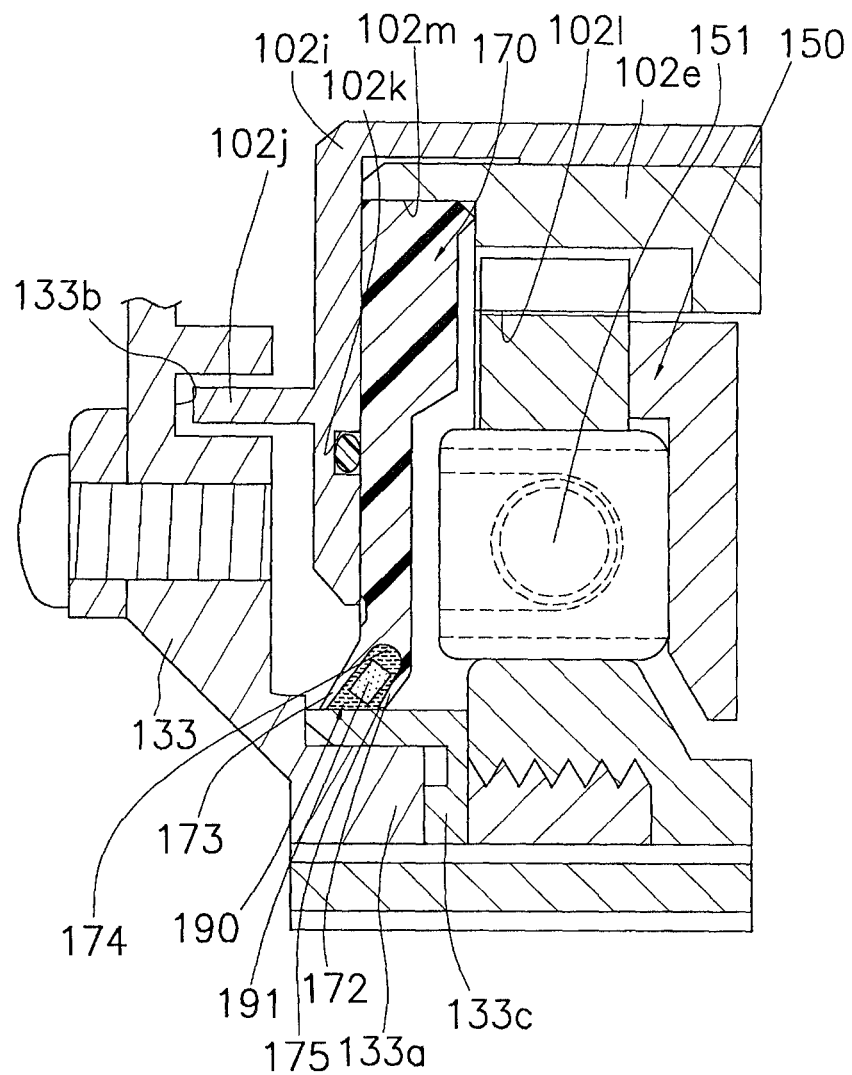
FIG. 13 is a view corresponding to FIG. 11 of another embodiment in the second embodiment.

(b) In the above-described embodiment, the first lip portion 172 of the first waterproofing member 170 is placed on the inner peripheral portion on the open side (the left side in FIG. 11) of the second front side inner peripheral portion 102m of the cylinder portion 102e, and the second lip portion 173 is placed on the inner peripheral portion on the opposite side (the right side in FIG. 11) of the open side of the second front side inner peripheral portion 102m. However, as shown in FIG. 13, the first lip portion 172 can also be placed on the inner peripheral portion on the opposite side (the right side in FIG. 11) of the open side of the second front side inner peripheral portion 102m, and the second lip portion 173 can also be placed on the inner peripheral portion on the open side (the left side in FIG. 11) of the second front side inner peripheral portion 102m.

Figure 14:
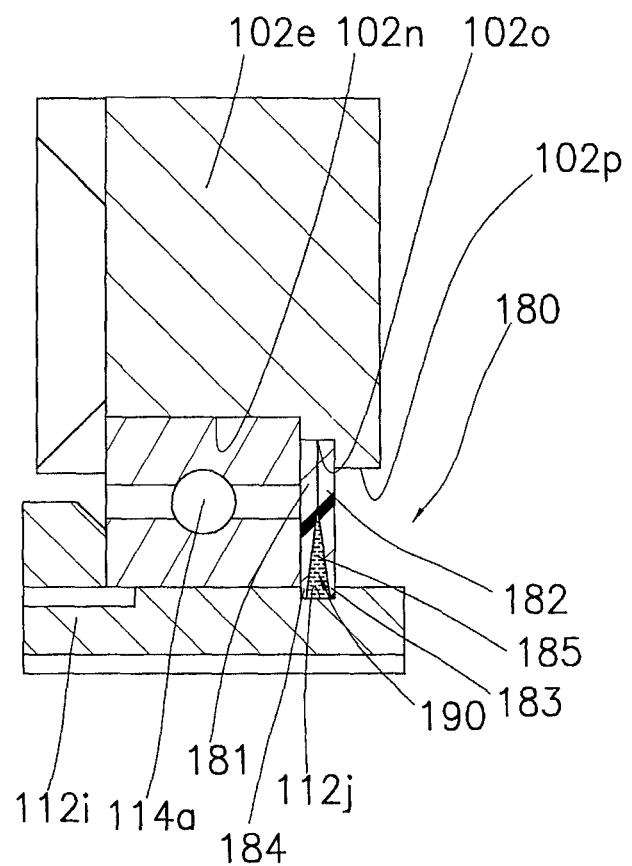
FIG. 14 is a view corresponding to FIG. 12 of another embodiment in the second embodiment.

(c) In the above-described embodiment, the first lip portion 183 of the second waterproofing member 180 is placed on the inner peripheral portion on the open side (the right side in FIG. 12) of the second rear side inner peripheral portion 102o of the cylinder portion 102e, and the second lip portion 184 is placed on the inner peripheral portion on the opposite side (the left side in FIG. 12) of the open side of the second rear side inner peripheral portion 102o. However, as shown in FIG. 14, the first lip portion 183 can also be placed on the inner peripheral portion on the opposite side (the left side in FIG. 12) of the open side of the second rear side inner peripheral portion 102o, and the second lip portion 184 can also be placed on the inner peripheral portion on the open side (the right side in FIG. 12) of the second rear side inner peripheral portion 102o.

Figure 15:
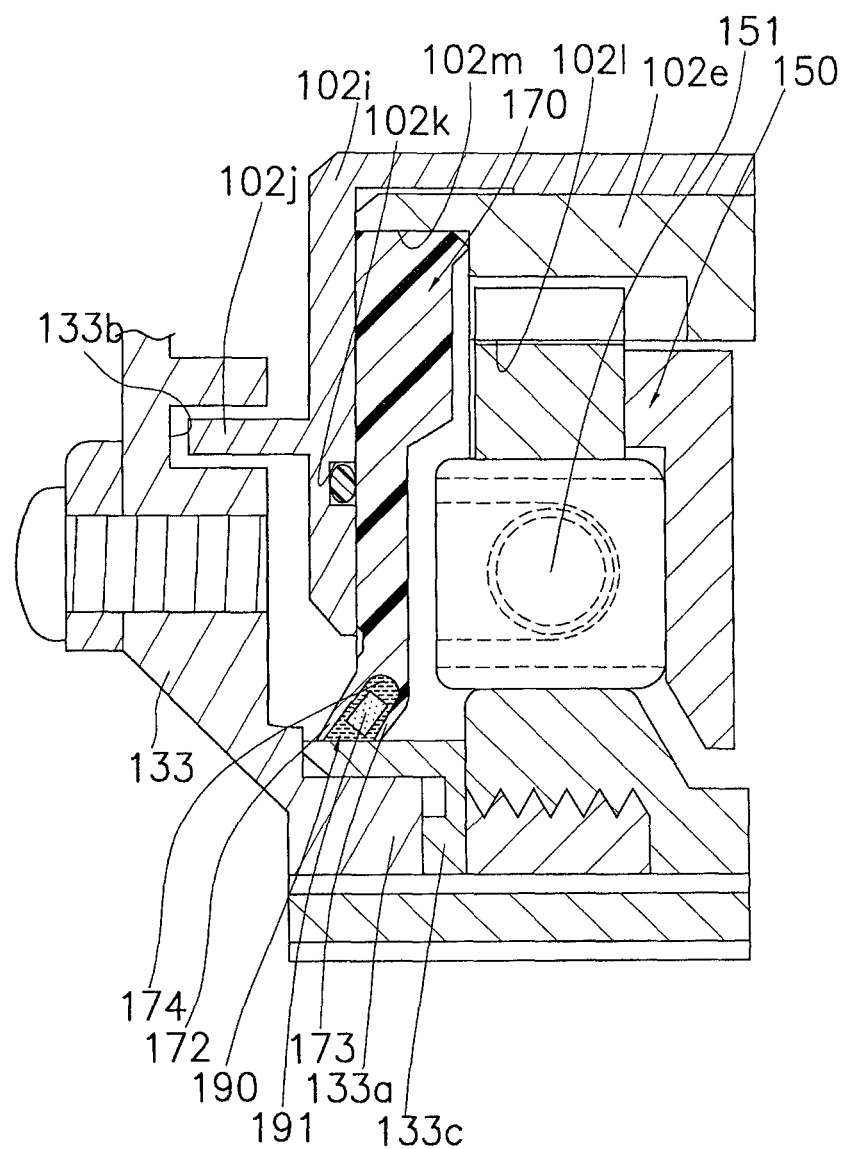
FIG. 15 is a view corresponding to FIG. 11 of another embodiment in the second embodiment.

(d) In the above-described embodiment, the interstice 175 is disposed between the first lip portion 172 of the first waterproofing member 170 and the outer peripheral portion of the cap member 133c of the rotor 103. However, as shown in FIG. 15, the first lip portion 172 can also be in contact with the outer peripheral portion of the cap member 133c of the rotor 103.

Figure 16:
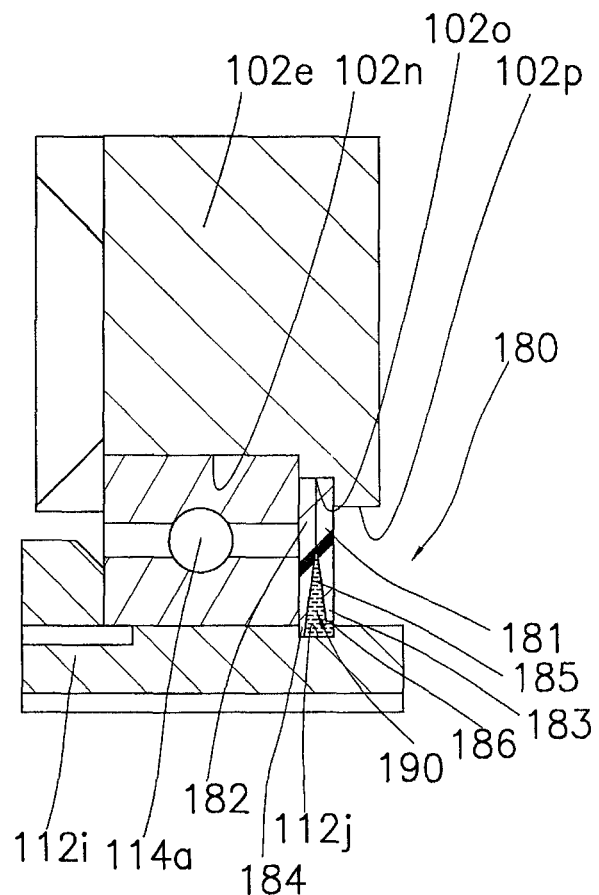
FIG. 16 is a view corresponding to FIG. 12 of another embodiment in the second embodiment.

(e) In the above-described embodiment, the first lip portion 183 of the second waterproofing member 180 is in contact with the outer peripheral portion of the recess portion 112j of the pinion gear 112. However, as shown in FIG. 16, an interstice 186 can also be disposed between the first lip portion 183 and the outer peripheral portion of the recess portion 112j.

Figure 17:
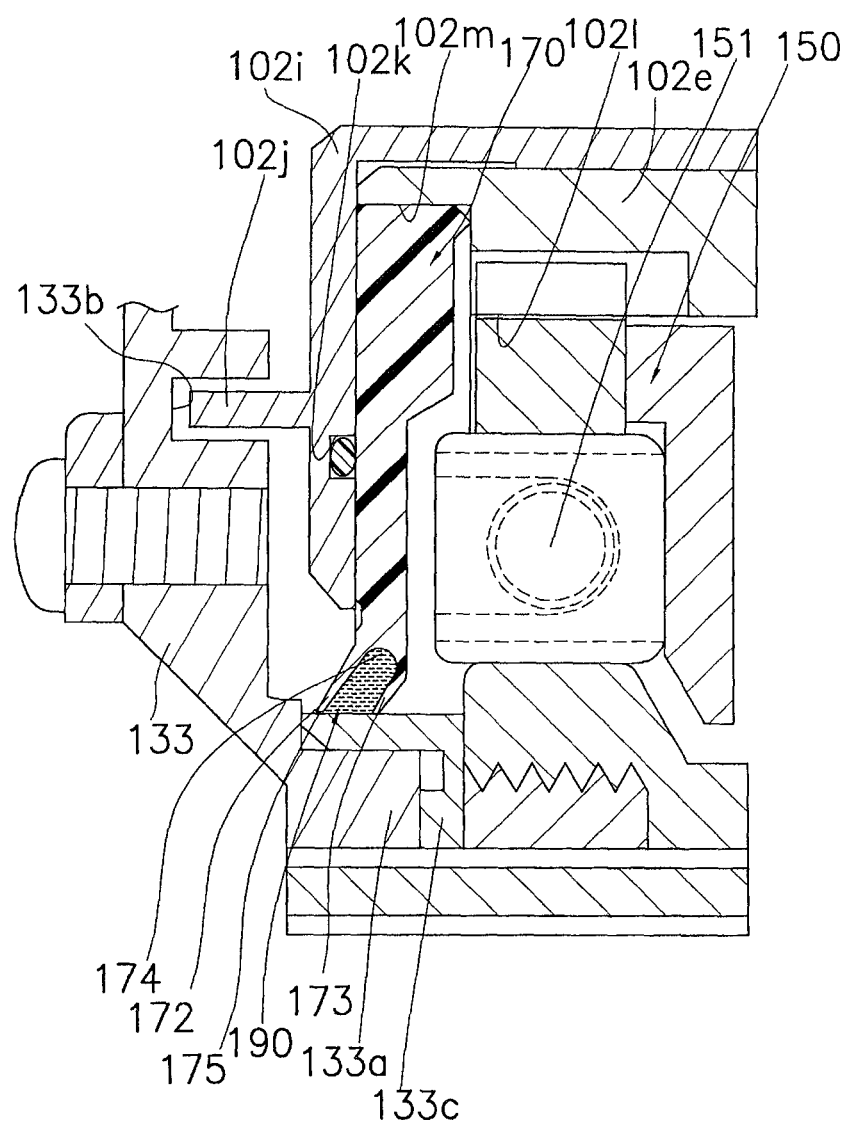
FIG. 17 is a view corresponding to FIG. 11 of another embodiment in the second embodiment.

(f) In the above-described embodiment, the grease 190 and the annular member 191 made of felt impregnated with the grease 190 are disposed in the grease holding portion 174. However, as shown in FIG. 17, the grease holding portion 174 can also be configured in such a way that just the grease 190 is disposed and the annular member 191 is not disposed.

(g) Instead of the second waterproofing member 180, two O-rings can also be attached between the inner peripheral portion of the second rear side inner peripheral portion 102o of the cylinder portion 102e and the outer peripheral portion of the recess portion 112j of the pinion gear 112.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning reel waterproofing member for waterproofing a space between a tubular portion and a rotating member of a spinning reel, the tubular portion disposed on a front end of a reel main body of the spinning reel, the rotating member disposed on an inner peripheral portion of the tubular portion and a front portion of the tubular portion, the spinning reel waterproofing member comprising:
a main body portion being fixed to the inner peripheral portion of the tubular portion and including a distal end portion, the distal end portion extending to an inner peripheral side;
a first lip portion extending in a radial direction so that the distal end portion of the main body portion is in contact with an outer peripheral portion of the rotating member; and
a second lip portion extending in an axial direction from a front surface of the first lip portion toward a rear surface of the rotating member.

2. The spinning reel waterproofing member according to claim 1, further comprising
a third lip portion configured to extend in the radial direction toward the outer peripheral portion of the rotating member in a position, the position being different from the position of the first lip portion in a front-and-rear direction and
a grease holding portion configured to hold grease and disposed between the first lip portion and the third lip portion on the outer peripheral portion of the rotating member.

3. The spinning reel waterproofing member according to claim 1, wherein
the rotating member is a rotor,
the rotor is supported rotatably on the front portion of the tubular portion,
the rotor including a cylinder portion,
the cylinder portion includes a front wall and a boss portion,
the front wall is formed on a front portion of the cylinder portion,
the boss portion is formed on an inner peripheral portion of the front wall,
the first lip portion extends in the radial direction toward an outer peripheral portion of the boss portion, and
the second lip portion extends in the axial direction toward a rear surface of the front wall.

4. The spinning reel waterproofing member according to claim 3, further comprising
a cap member being attached to the boss portion, wherein the first lip portion extends in the radial direction toward an outer peripheral portion of the cap member.

5. The spinning reel waterproofing member according to claim 1, wherein
the main body portion is fixed in a vicinity of a front side of a roller clutch, and
the roller clutch is disposed on a front side inner peripheral portion of the tubular portion and configured to regulate the rotational direction of the rotor.

6. The spinning reel waterproofing member according to claim 1, wherein
the main body portion, the first lip portion, and the second lip portion are integrally formed.

7. A spinning reel being arranged to be attached to a fishing rod and being for forwardly paying out a fishing line, the spinning reel comprising:
a reel main body being arranged to be attached to the fishing rod and including a tubular portion on its front end;
a spool shaft being attached to the reel main body and being configured to move along a front-and-rear direction;
a spool being attached to a front end of the spool shaft and including an outer periphery; and
a rotor being disposed rotatably in an outer peripheral side of the spool and configured to wind the fishing line onto the outer periphery of the spool; and
the waterproofing member according to claim 1.

8. A spinning reel waterproofing member for waterproofing a space between a tubular and a rotating member of a spinning reel, the tubular portion disposed on a front end of a reel main body of the spinning reel and the rotating member disposed on an inner peripheral portion of the tubular portion, the spinning reel waterproofing member comprising:
a main body portion being fixed to the inner peripheral portion of the tabular portion and including a distal end portion, the distal end portion extending to an inner peripheral side;
a first lip portion extending toward an outer peripheral portion of the rotating member:
a second lip portion extending in such a way as to be in contact with the outer peripheral portion of the rotating member in a position, the position being different from the position of the first lip portion in a front-and-rear direction; and
a grease holding portion configured to hold grease and disposed between the first lip portion and the second lip portion on the outer peripheral portion of the rotating member.

9. The spinning reel waterproofing member according to claim 8, wherein
the main body portion is fixed in a vicinity of a front side of a roller clutch,
the roller clutch is disposed on a front side inner peripheral portion of the tubular portion,
the rotating member is a rotor,
a rotational direction of the rotor is regulated by the roller clutch, and
the first lip portion and the second lip portion extend toward an outer peripheral portion of the rotor.

10. The spinning reel waterproofing member according to claim 8, wherein
the main body portion is fixed in a vicinity of a rear side of a bearing,
the bearing is disposed on a rear side inner peripheral portion of the tubular portion,
the rotating member is a pinion gear which is supported by the bearing, and
the first lip portion and the second lip portion extend toward the pinion gear.

11. The spinning reel waterproofing member according to claim 8, wherein
   the first lip portion is disposed on an inner peripheral portion of an open side of the tubular portion, and
   the second lip portion is disposed on an inner peripheral portion on the opposite side of the open side of the tubular portion.

12. The spinning reel waterproofing member according to claim 8, wherein
   the first lip portion is disposed on an inner peripheral portion on the opposite side of an open side of the tubular portion, and
   the second lip portion is disposed on the open side of the tubular portion.

13. The spinning reel waterproofing member according to claim 8, further comprising
   an annular member that is attached to the grease holding portion.

14. The spinning reel waterproofing member according to claim 8, wherein
   the distal end portion of the main body portion is divided into first and second parts,
   the first part is the first lip portion, and
   the second part is the second lip portion.

15. The spinning reel waterproofing member according to claim 8, wherein
   the main body portion includes a first main body portion and a second main body portion,
   the second main body portion is a separate body being apart from the first main body portion,
   the first lip portion is integrally formed on an distal end portion of the first main body portion, and
   the second lip portion is integrally formed on an distal end portion of the second main body portion.

16. A spinning reel being arranged to be attached to a fishing rod and being for forwardly paying out a fishing line, the spinning reel comprising:
   a reel main body being attached to the fishing rod and including a tubular portion on a front end thereof;
   a spool shaft being arranged to be attached to the reel main body and being configured to move along a front-and-rear direction;
   a spool being attached to a front end of the spool shaft and including an outer periphery, the fishing line being wound on the outer periphery; and
   a rotor being disposed rotatably in an outer peripheral side of the spool and being configured to wind the fishing line onto the outer periphery of the spool; and
   the waterproofing member according to claim 8.

17. A spinning reel waterproofing member for waterproofing a space between a tubular and a rotating member of a spinning reel, the tubular portion distal disposed on a front end of a reel main body of spinning reel and the rotating member disposed on an inner peripheral portion of the tubular portion, the spinning reel waterproofing member comprising:
   a main body portion being fixed to the inner peripheral portion of the tubular portion and including a distal end portion, the distal end portion extending to an inner peripheral side;
   a first lip portion extending toward an outer peripheral portion of the rotating member;
   a second lip portion extending in such a way as to be in contact with the outer peripheral portion of the rotating member in a position, the position being different from the position of the first lip portion in a front-and-rear direction; and
   a grease holding portion configured to hold grease and disposed between the first lip portion and the second lip portion on the outer peripheral portion of the rotating member; and
   an annular member attached to the grease holding portion, and being a member made of felt impregnated with the grease.

* * * * *